United States Patent
Kim et al.

(10) Patent No.: US 9,307,564 B2
(45) Date of Patent: Apr. 5, 2016

(54) AUTOMATIC DEVICE-TO-DEVICE CONNECTION CONTROL BY ENVIRONMENTAL INFORMATION

(71) Applicant: QUALCOMM Incorporated, San Diego, CA (US)

(72) Inventors: Taesu Kim, Seoul (KR); Kisun You, Seoul (KR); Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 13/895,662

(22) Filed: May 16, 2013

(65) Prior Publication Data

US 2013/0308506 A1   Nov. 21, 2013

Related U.S. Application Data

(60) Provisional application No. 61/649,077, filed on May 18, 2012.

(51) Int. Cl.
  *H04W 76/02*   (2009.01)
  *H04W 12/04*   (2009.01)
  *H04W 84/18*   (2009.01)

(52) U.S. Cl.
  CPC ............ *H04W 76/023* (2013.01); *H04W 12/04* (2013.01); *H04W 84/18* (2013.01)

(58) Field of Classification Search
  None
  See application file for complete search history.

(56) References Cited

U.S. PATENT DOCUMENTS

| | | | |
|---|---|---|---|
| 8,224,351 | B1 | 7/2012 | Sushkov et al. |
| 9,042,906 | B1 * | 5/2015 | Sushkov ................... G01S 5/02 340/539.13 |
| 2006/0282649 | A1 | 12/2006 | Malamud et al. |
| 2008/0172361 | A1 * | 7/2008 | Wong .................... H04L 63/123 |
| 2009/0176505 | A1 | 7/2009 | Van Deventer et al. |
| 2010/0318656 | A1 | 12/2010 | Ferren |
| 2012/0224707 | A1 | 9/2012 | Kim et al. |
| 2012/0265818 | A1 * | 10/2012 | Van Phan .............. H04W 8/005 709/204 |

(Continued)

FOREIGN PATENT DOCUMENTS

| | | |
|---|---|---|
| EP | 2073515 A1 | 6/2009 |
| GB | 2447674 A | 9/2008 |

OTHER PUBLICATIONS

International Search Report and Written Opinion—PCT/US2013/044204—ISA/EPO—Feb. 7, 2014.

(Continued)

*Primary Examiner* — Ashley Shivers
(74) *Attorney, Agent, or Firm* — Raphael Freiwirth; Espartaco Diaz Hidalgo

(57) ABSTRACT

The various aspects are directed to automatic device-to-device connection control. An aspect extracts a first sound signature, wherein the extracting the first sound signature comprises extracting a sound signature from a sound signal emanating from a certain direction, receives a second sound signature from a peer device, compares the first sound signature to the second sound signature, and pairs with the peer device. An aspect extracts a first sound signature, wherein the extracting the first sound signature comprises extracting a sound signature from a sound signal emanating from a certain direction, sends the first sound signature to a peer device, and pairs with the peer device. An aspect detects a beacon sound signal, wherein the beacon sound signal is detected from a certain direction, extracts a code embedded in the beacon sound signal, and pairs with a peer device.

68 Claims, 17 Drawing Sheets

(56) References Cited

U.S. PATENT DOCUMENTS

| | | | | |
|---|---|---|---|---|
| 2013/0028177 | A1* | 1/2013 | Koskela | H04W 4/005 370/328 |
| 2013/0040572 | A1 | 2/2013 | Berrett et al. | |
| 2013/0079033 | A1 | 3/2013 | Gupta et al. | |
| 2013/0331135 | A1* | 12/2013 | Novak | H04W 76/023 455/500 |
| 2014/0051357 | A1* | 2/2014 | Steer | H04L 63/0876 455/41.2 |
| 2015/0080002 | A1* | 3/2015 | Cho | H04W 76/023 455/450 |
| 2015/0126188 | A1* | 5/2015 | Lindoff | H04W 8/005 455/434 |

OTHER PUBLICATIONS

Nguyen N., et al., "Using ambient audio in secure mobile phone communication," Pervasive Computing and Communications Workshops (PERCOM Workshops), 2012 IEEE International Conference on, IEEE, Mar. 19, 2012, pp. 431-434, XP032180001, DOI: 10.1109/PERCOMW.2012.6197527 ISBN: 978-1-4673-0905-9.

Partial International Search Report—PCT/US2013/044204—ISA/EPO—Nov. 4, 2013.

* cited by examiner

AUTOMATIC DEVICE-TO-DEVICE CONNECTION CONTROL BY ENVIRONMENTAL INFORMATION

CLAIM OF PRIORITY UNDER 35 U.S.C. §119

The present application for patent claims the benefit of Provisional Application No. 61/649,077, entitled "AUTOMATIC DEVICE-TO-DEVICE CONNECTION CONTROL BY ENVIRONMENTAL INFORMATION," filed May 18, 2012, and assigned to the assignee hereof and hereby expressly incorporated by reference herein.

BACKGROUND

1. Field of the Disclosure

The various aspects of the disclosure are directed to automatic device-to-device connection control by environmental information.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The various aspects of the disclosure are directed to automatic device-to-device connection control by environmental information.

A method for automatically controlling a device-to-device connection includes extracting a first sound signature, wherein the extracting the first sound signature comprises extracting a sound signature from a sound signal emanating from a certain direction, receiving a second sound signature from a peer device, comparing the first sound signature to the second sound signature, and pairing with the peer device when a difference between the first sound signature and the second sound signature is within a predetermined range.

A method for automatically controlling a device-to-device connection includes extracting a first sound signature, wherein the extracting the first sound signature comprises extracting a sound signature from a sound signal emanating from a certain direction, sending the first sound signature to a peer device, and pairing with the peer device.

A method for automatically controlling a device-to-device connection includes detecting a beacon sound signal, wherein the beacon sound signal is detected from a certain direction, extracting a code embedded in the beacon sound signal, and pairing with a peer device when the code matches a predetermined code.

A method for automatically controlling a device-to-device connection includes sending a beacon sound signal, wherein a predetermined code is embedded in the beacon sound signal, and wherein the beacon sound signal is detected by a peer device from a certain direction, and pairing with the peer device.

An apparatus for automatically controlling a device-to-device connection includes a processing system configured to extract a first sound signature, wherein extracting the first sound signature comprises extracting a sound signature from a sound signal emanating from a certain direction, receive a second sound signature from a peer device, compare the first sound signature to the second sound signature, and pair with the peer device when a difference between the first sound signature and the second sound signature is within a predetermined range.

An apparatus for automatically controlling a device-to-device connection includes a processing system configured to extract a first sound signature, wherein extracting the first sound signature comprises extracting a sound signature from a sound signal emanating from a certain direction, send the first sound signature to a peer device, and pair with the peer device.

An apparatus for automatically controlling a device-to-device connection includes a processing system configured to detect a beacon sound signal, wherein the beacon sound signal is detected from a certain direction, extract a code embedded in the beacon sound signal, and pair with a peer device when the code matches a predetermined code.

An apparatus for automatically controlling a device-to-device connection includes a processing system configured to send a beacon sound signal, wherein a predetermined code is embedded in the beacon sound signal, and wherein the beacon sound signal is detected by a peer device from a certain direction, and pair with the peer device.

An apparatus for automatically controlling a device-to-device connection includes means for extracting a first sound signature, wherein the extracting the first sound signature comprises extracting a sound signature from a sound signal emanating from a certain direction, means for receiving a second sound signature from a peer device, means for comparing the first sound signature to the second sound signature, and means for pairing with the peer device when a difference between the first sound signature and the second sound signature is within a predetermined range.

An apparatus for automatically controlling a device-to-device connection includes means for extracting a first sound signature, wherein the extracting the first sound signature comprises extracting a sound signature from a sound signal emanating from a certain direction, means for sending the first sound signature to a peer device, and means for pairing with the peer device.

An apparatus for automatically controlling a device-to-device connection includes means for detecting a beacon sound signal, wherein the beacon sound signal is detected from a certain direction, means for extracting a code embedded in the beacon sound signal, and means for pairing with a peer device when the code matches a predetermined code.

An apparatus for automatically controlling a device-to-device connection includes means for sending a beacon sound signal, wherein a predetermined code is embedded in the beacon sound signal, and wherein the beacon sound signal is detected by a peer device from a certain direction, and means for pairing with the peer device.

A non-transitory computer-readable medium for automatically controlling a device-to-device connection includes at least one instruction to extract a first sound signature, wherein extracting the first sound signature comprises extracting a sound signature from a sound signal emanating from a certain direction, at least one instruction to receive a second sound signature from a peer device, at least one instruction to compare the first sound signature to the second sound signature, and at least one instruction to pair with the peer device when a difference between the first sound signature and the second sound signature is within a predetermined range.

A non-transitory computer-readable medium for automatically controlling a device-to-device connection includes at least one instruction to extract a first sound signature, wherein extracting the first sound signature comprises extracting a sound signature from a sound signal emanating from a certain direction, at least one instruction to send the first sound signature to a peer device, and at least one instruction to pair with the peer device.

A non-transitory computer-readable medium for automatically controlling a device-to-device connection includes at least one instruction to detect a beacon sound signal, wherein the beacon sound signal is detected from a certain direction, at least one instruction to extract a code embedded in the beacon sound signal, and at least one instruction to pair with a peer device when the code matches a predetermined code.

A non-transitory computer-readable medium for automatically controlling a device-to-device connection includes at least one instruction to send a beacon sound signal, wherein a predetermined code is embedded in the beacon sound signal, and wherein the beacon sound signal is detected by a peer device from a certain direction, and at least one instruction to pair with the peer device.

DETAILED DESCRIPTION

Figure 1:
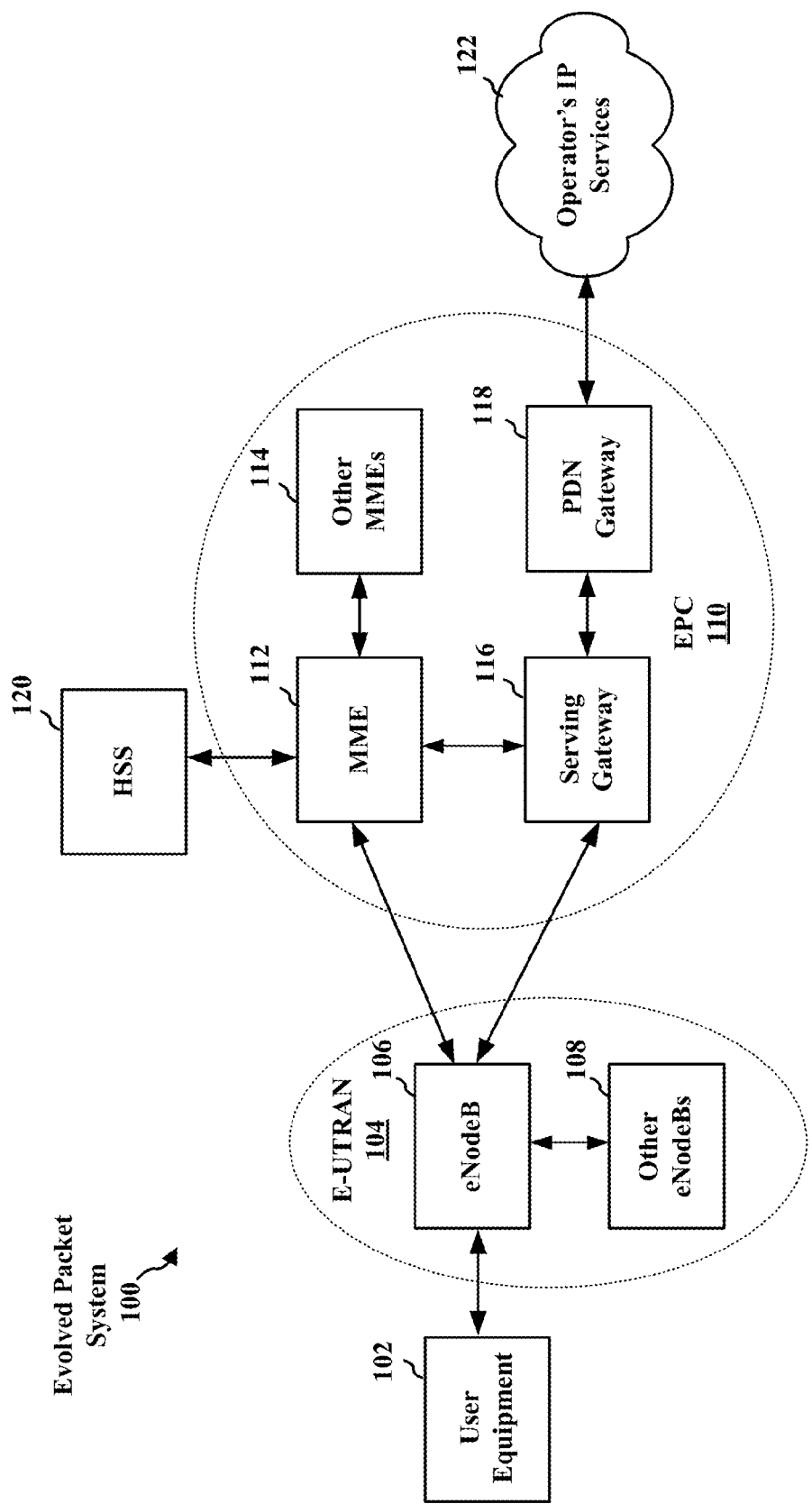
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random access memory (RAM), read-only memory (ROM), electrically erasable programmable ROM (EEPROM), a CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipments (UEs) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102.

A client device, referred to herein as a UE, may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.), and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
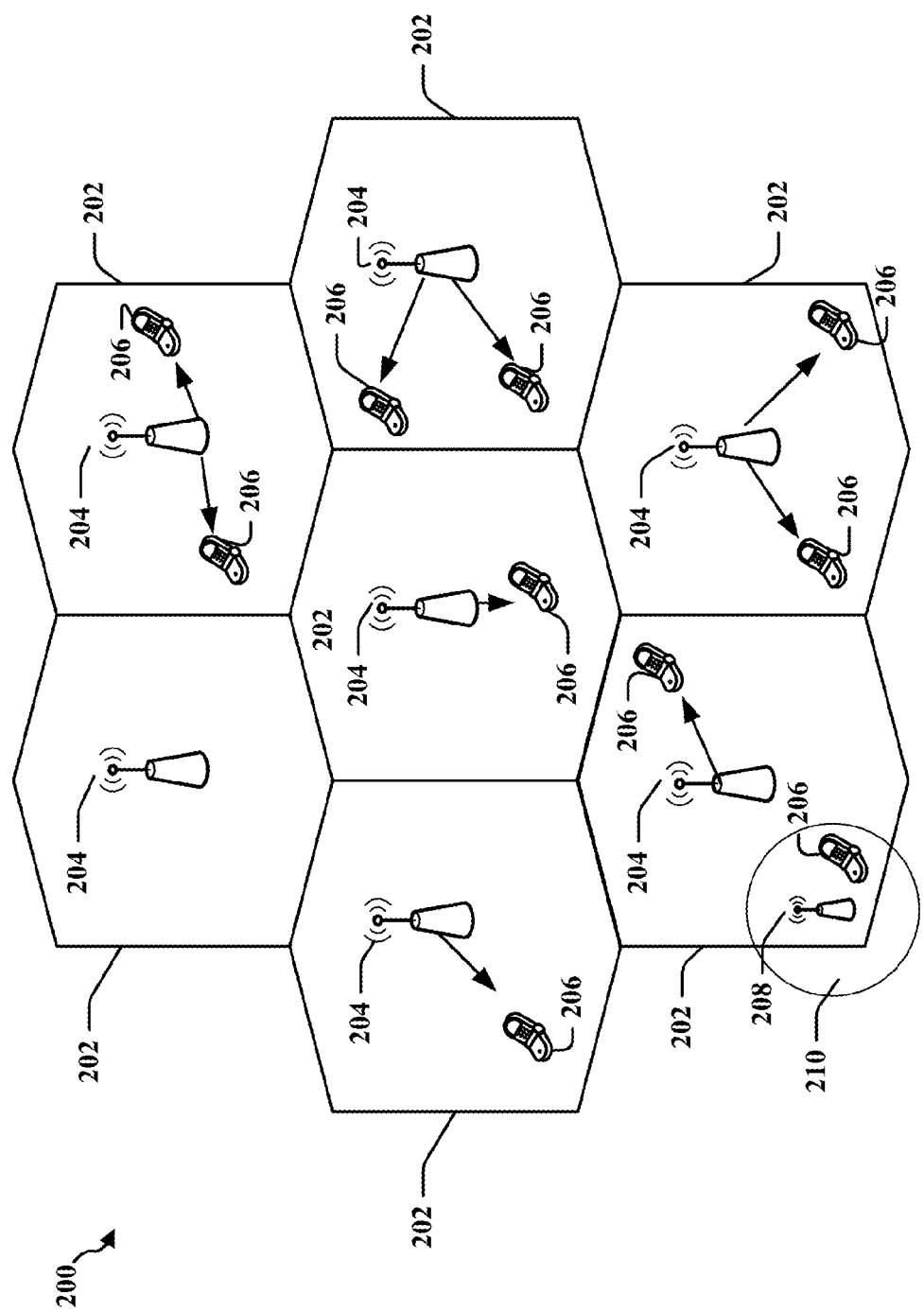
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The macro eNBs 204 may have multiple antennas supporting MIMO technology. The use of MIMO technology enables the macro eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the macro eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
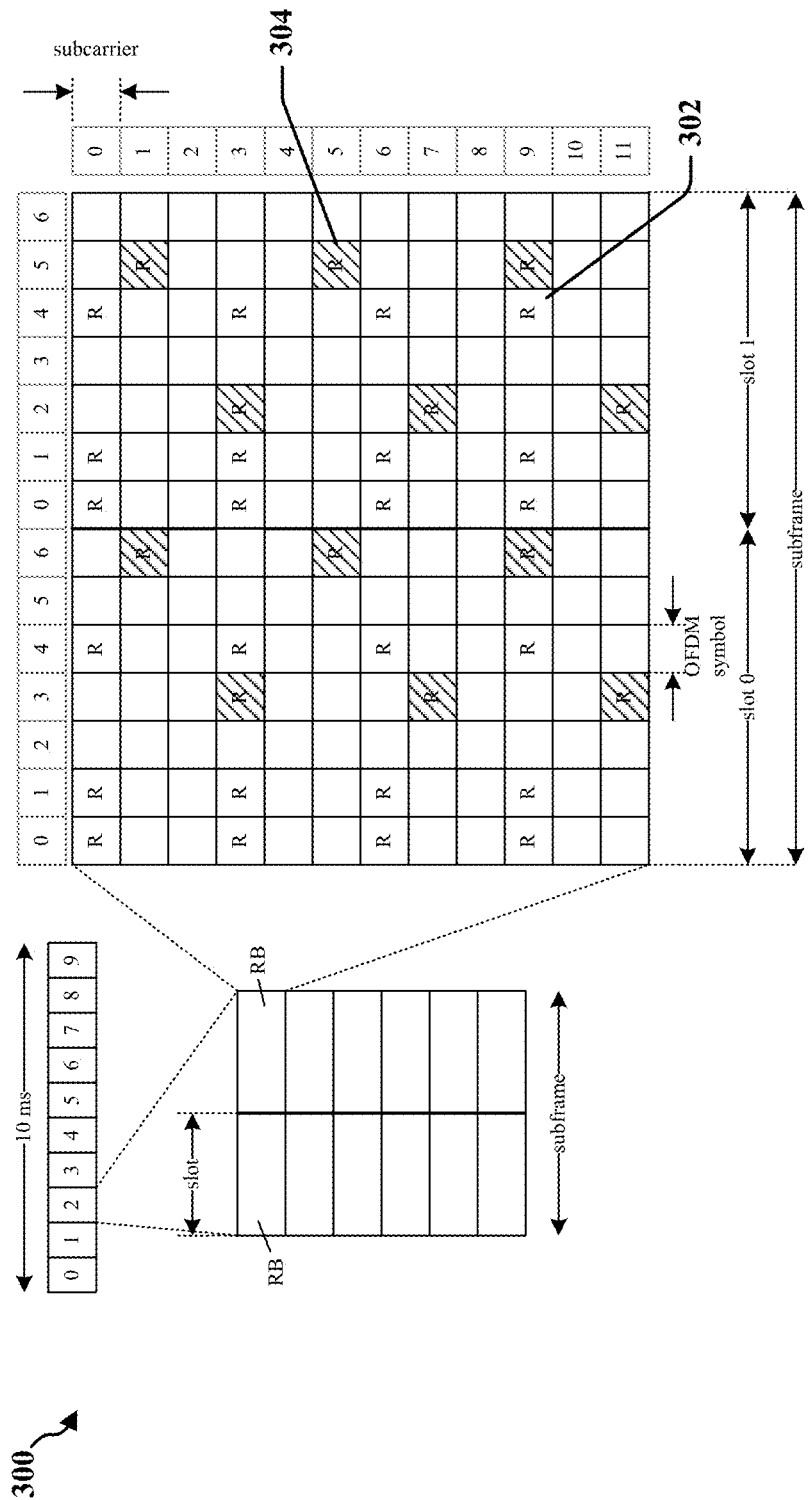
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
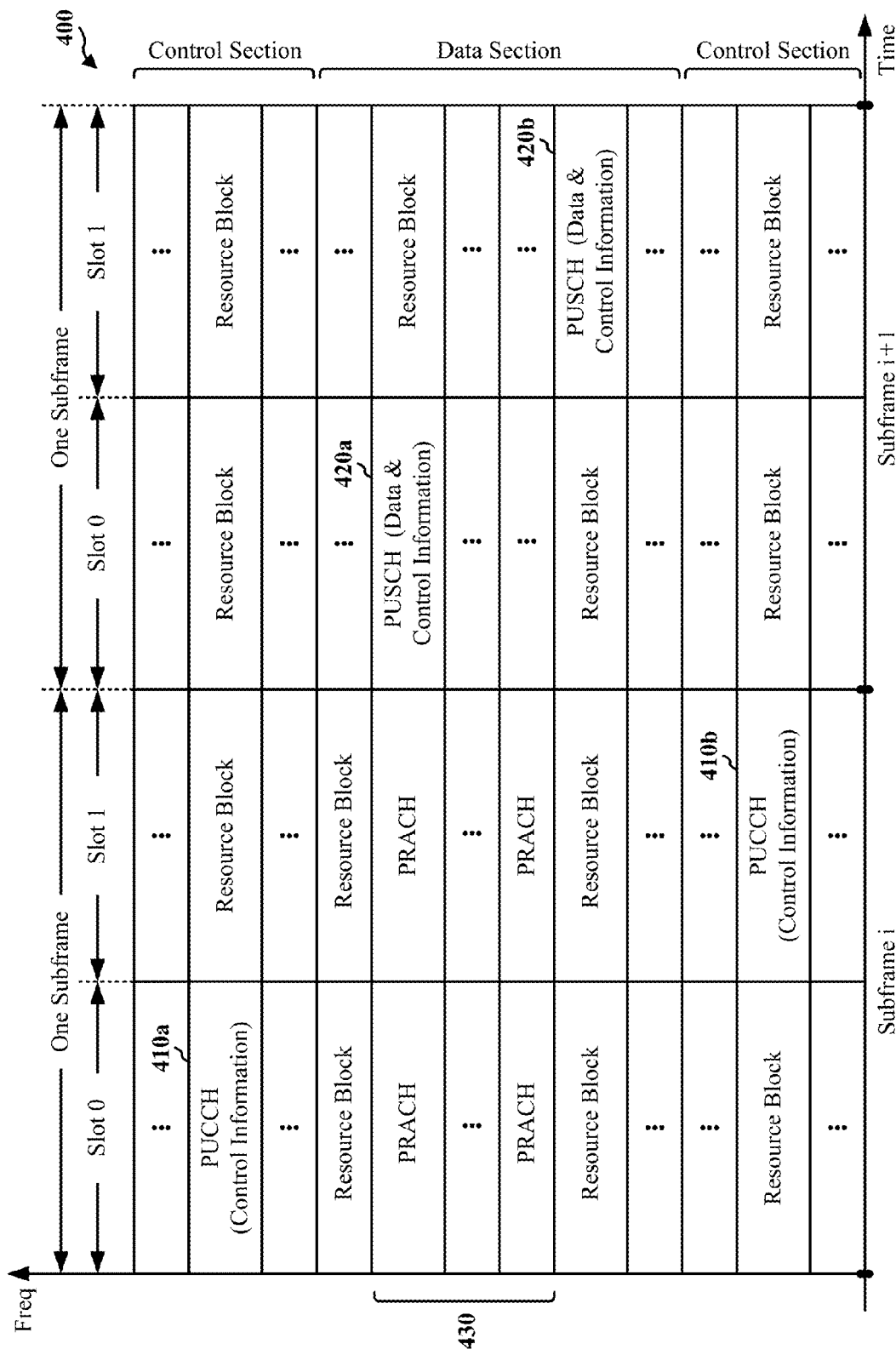
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
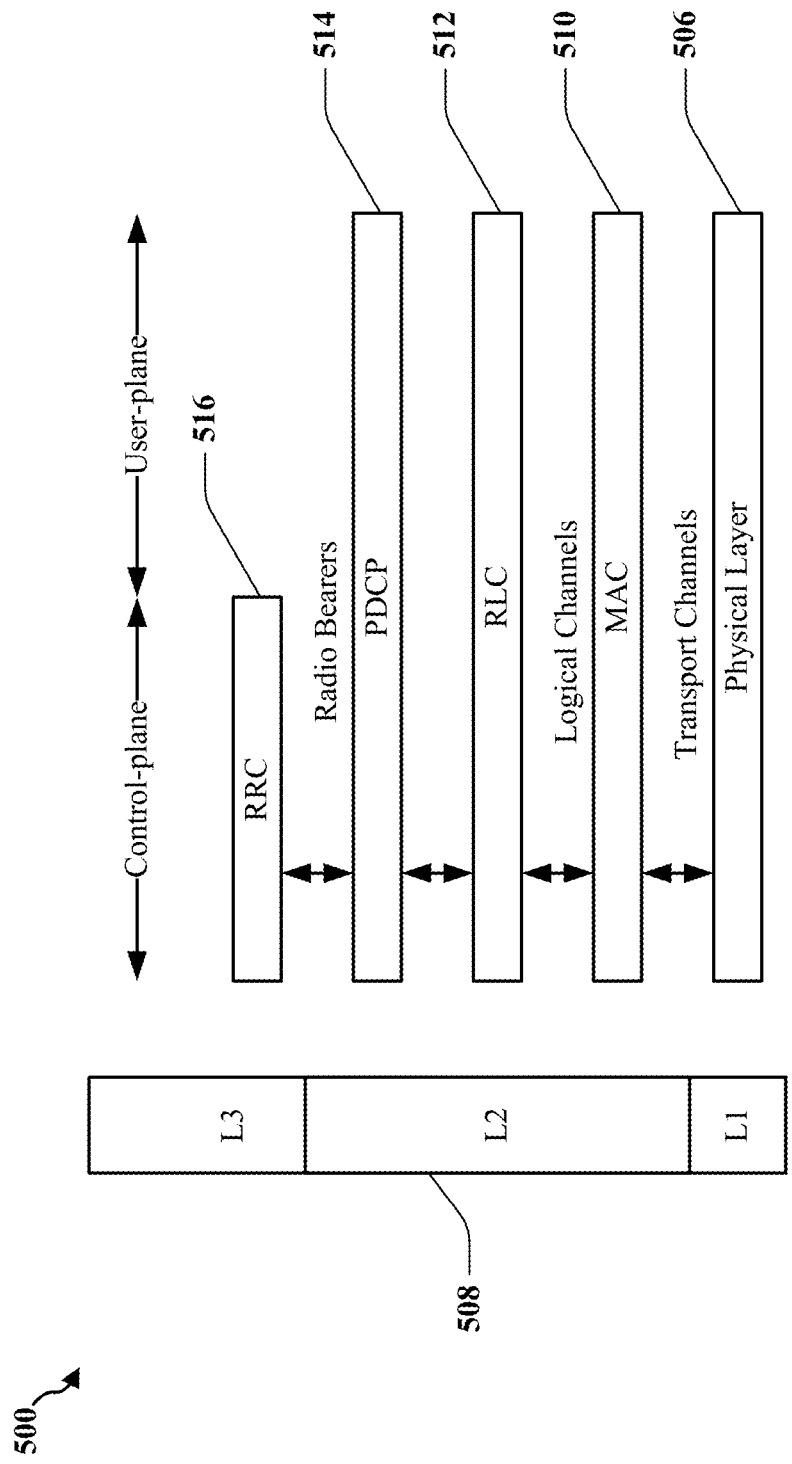
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
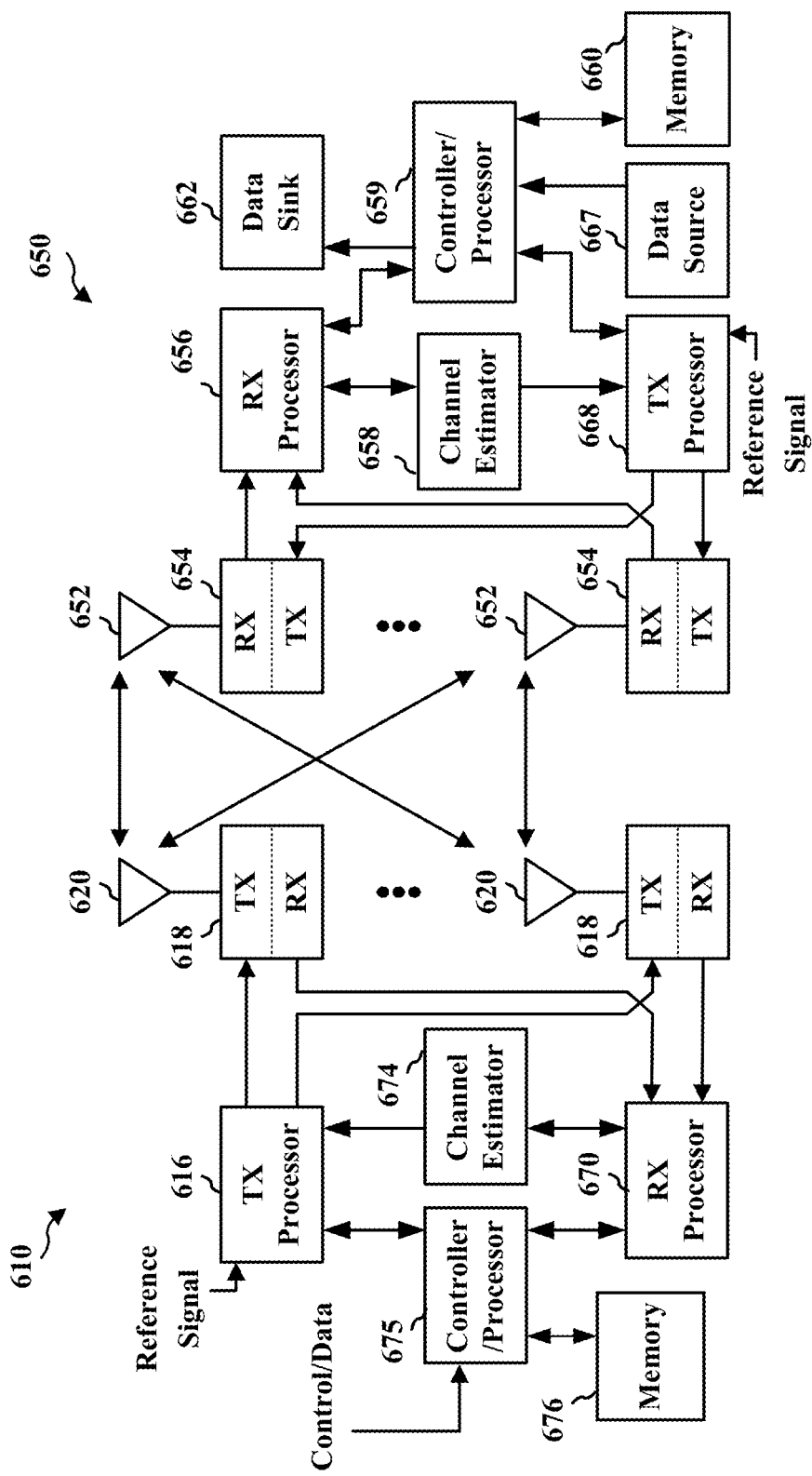
FIG. 6 is a diagram illustrating an example of an evolved Node B and user equipment in an access network.

FIG. 6 is a block diagram of an eNB 610, which may correspond to any of eNode Bs 106, 108, and 204, in communication with a UE 650, which may correspond to any of UEs 102 and 206, in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to an RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
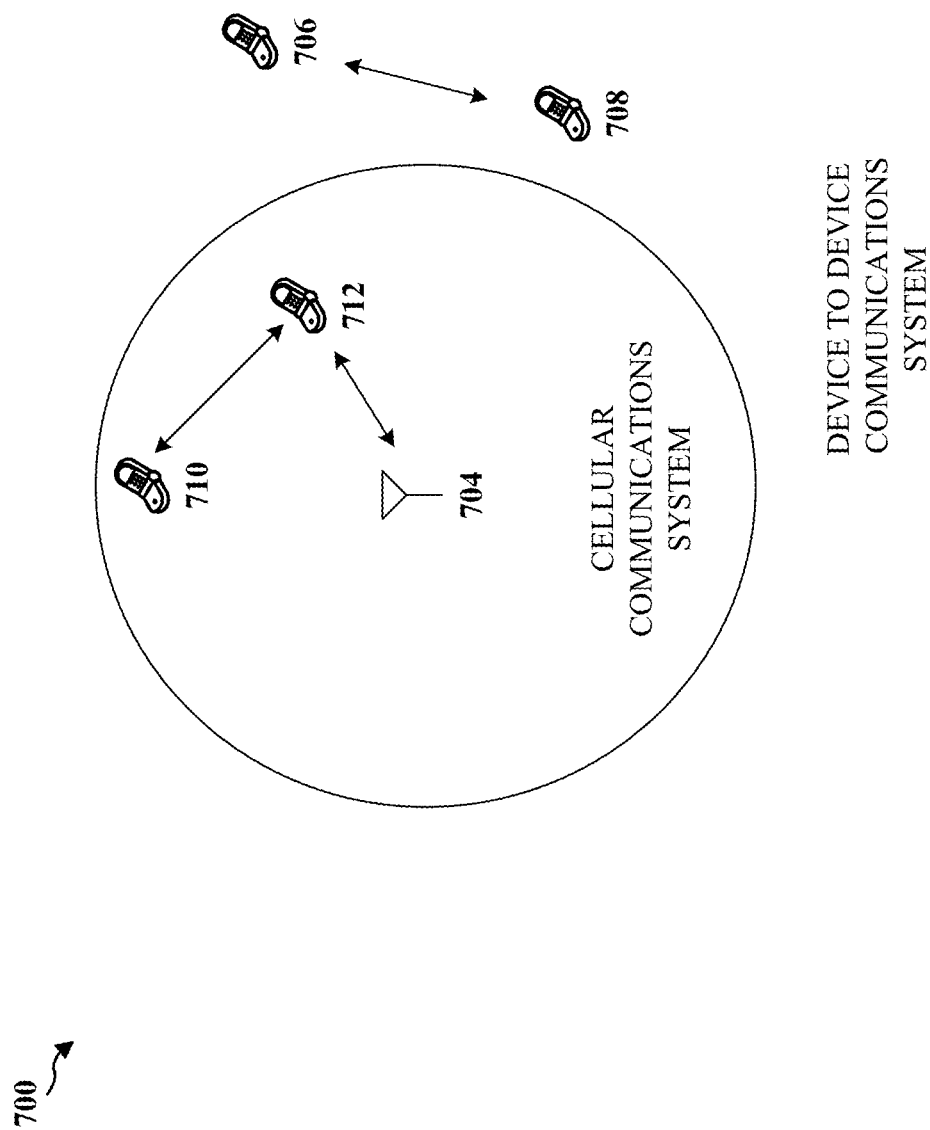
FIG. 7 is a diagram of an exemplary device-to-device communications system.

FIG. 7 is a diagram of an exemplary device-to-device communications system 700. The device-to-device communications system may also be referred to as a mobile-to-mobile communications system, a terminal-to-terminal communications system, or a peer-to-peer communications system. The device-to-device communications system comprises at least two devices located relatively close to each other that communicate without the aid or assistance of an access node (e.g., base station, relay station, eNB, etc.). The at least two devices may communicate with one another without significantly impacting communications between the access node and other devices in the system.

Referring to FIG. 7, the device-to-device communications system 700 may, for example, include a plurality of wireless devices 706, 708, 710, 712. The device-to-device communications system 700 may overlap with a cellular communications system, such as a wireless wide area network (WWAN). Some of the wireless devices 706, 708, 710, 712 may communicate together in device-to-device communication, some may communicate with the base station 704, and some may do both. For example, as shown in FIG. 7, the wireless devices 706, 708 are in device-to-device communication and the wireless devices 710, 712 are in device-to-device communication. The wireless device 712 is also communicating with the base station 704.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra may be applicable to any of a variety of wireless device-to-device communications systems, for example, a wireless device-to-device communication system based on FlashLinQ, now LTE Direct, WiMedia, Bluetooth, ZigBee, Wi-Fi based on the IEEE 802.11 standard, including Wi-Fi Direct, and/or the like.

In an aspect of the disclosure, device-to-device communication may be implemented in a home sharing network. In the home sharing network, various user devices are capable of communicating with each other in order to share data from one device to another. For example, the home sharing network may allow the user to wirelessly send a video file stored on the user's mobile phone to a television to allow the user to view the video on a larger screen. In another example, the user may wirelessly send a music file stored on the user's mobile phone to an external speaker to allow the user to listen to the music via such speaker. In a further example, the user may wirelessly transfer photos from one device (e.g., mobile phone) to another device (e.g., tablet device, television, etc.).

To facilitate device-to-device communication, devices may utilize a radio frequency (RF) signal of any one of a number of wireless device-to-device communication systems (e.g., Wi-Fi, Bluetooth, etc). Because the coverage area of an RF signal is large, and because the RF signal is capable of penetrating obstacles (e.g., building walls), an authorization process is necessary to ensure security. However, the authorization process may be quite cumbersome. For example, in the home sharing network, in order for devices to perform device-to-device communication with other devices in the network, pairing of the devices must be performed.

Pairing may involve a first device using a radio frequency to discover a second device. Once the second device is found, a user's account name and password associated with the first device may be communicated to the second device. The second device may then compare the communicated account name and password with a stored account name and password. If the second device recognizes the user account name and password associated with the first device, then device-to-device communication between the first device and second device may be authorized. As such, when at least two devices of the home sharing network are, for example, within range of the same Wi-Fi access point, and recognize the same user account name and password, then the at least two devices may share data/information via device-to-device communication. Notably, in order for a user device to be able to communicate with another user device via device-to-device communication in the home sharing network, each device must have knowledge of the user's account name and password.

In an aspect, to make the device-to-device communication authorization process less cumbersome, environmental sound information may be captured via a sound sensor (e.g., microphone) of a device, and used to authorize and/or control a device-to-device connection. The environmental sound information may include ambient noise, noise emitted from a machine or device, human voice or any other audio signal having a limited range compared to an RF signal.

Figure 8:
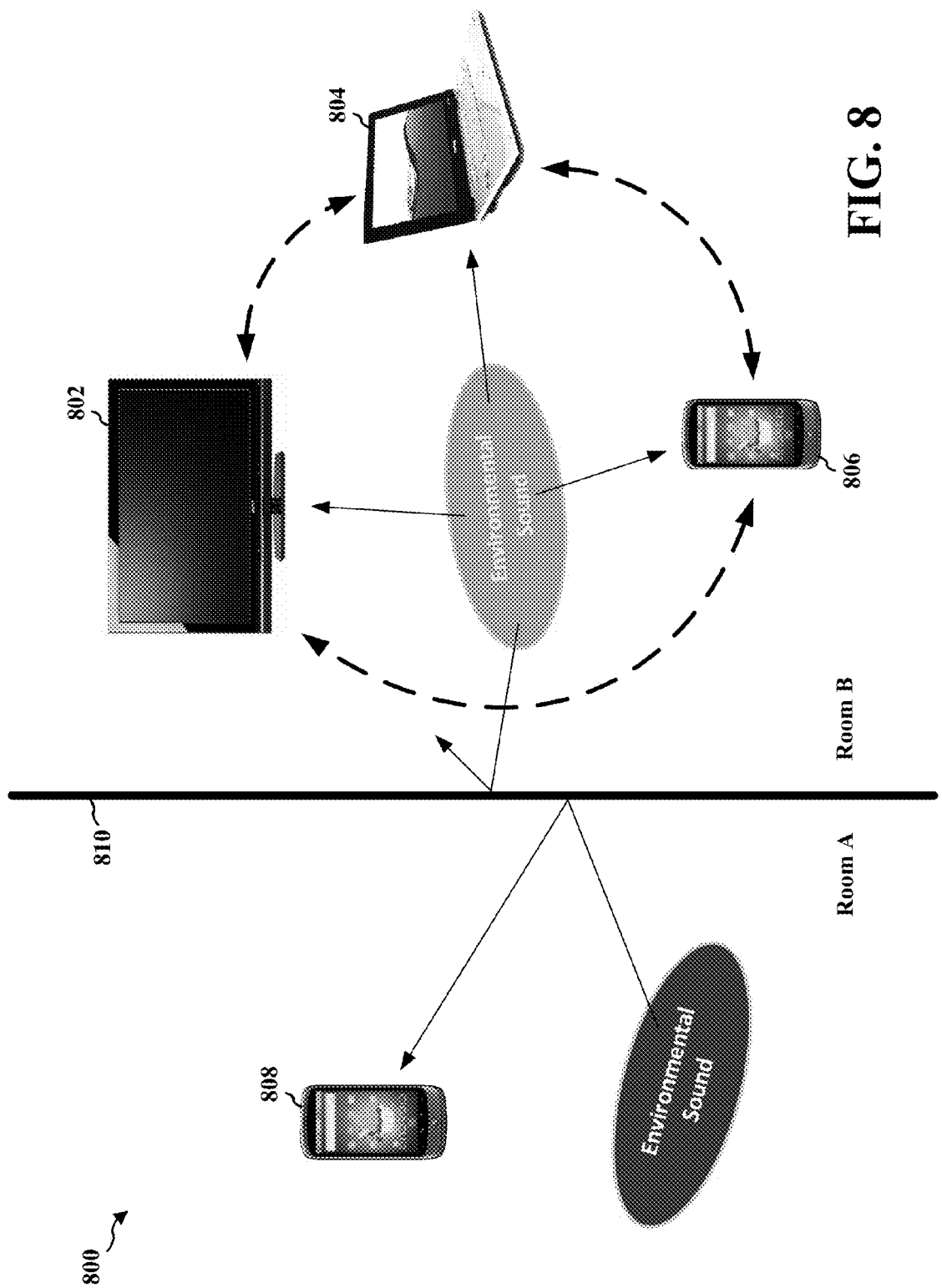
FIG. 8 is a diagram illustrating a communications system utilizing environmental sound information to automatically authorize a device-to-device connection.

FIG. 8 is a diagram 800 illustrating a communications system utilizing environmental sound information to automatically authorize a device-to-device connection. Referring to FIG. 8, a first device (e.g., television) 802, a second device (e.g., computer) 804, and a third device (e.g., mobile phone) 806 are located in the same general location (Room B). A fourth device (e.g., mobile phone) 808 is located in another location (Room A) separated from Room B by a wall 810. Each of the devices depicted in FIG. 8 may be referred to as a UE.

If two or more devices are in the same general location, then the environmental sound information (e.g., ambient noise) respectively sensed by the two or more devices may be highly similar. Using this information, a proximity of the devices with respect to each other may be measured. For example, as shown in FIG. 8, the environmental sound respectively sensed by the device 802, the device 804, and the device 806 may be similar. Accordingly, if the environmental sound sensed by the device 802 is highly similar to the environmental sound sensed by the device 804 and the device 806, then it may be determined that the device 802, the device 804, and the device 806 are in the same general location, i.e., Room B. Consequently, because the devices are in the same general location (Room B), it may also be determined that the devices are close enough together to automatically pair with each other for performing device-to-device communication.

Further, as shown in FIG. 8, the wall 810 blocks any environmental sound in Room A from entering into Room B, and vice versa. Thus, the environmental sound sensed by the device 808 in Room B may not be similar to the environmental sound sensed by the devices in Room A. As such, because the environmental sound sensed by the device 808 is dissimilar to the environmental sound sensed by the device 802, device 804, or the device 806, it may be determined that the device 808 is not in the same general location as the device 802, device 804, or device 806. Similarly, it may be determined that the device 802, device 804, or device 806 is not in the same general location as the device 808. Consequently, because the device in Room A is not in the same general location as the devices in Room B, it may be determined that the device 808 is not in near enough proximity to automatically pair with either of the device 802, device 804, or device 806 for performing device-to-device communication.

In a further aspect, to make the device-to-device communication authorization process less cumbersome, a beacon sound signal may be captured via a sound sensor (e.g., microphone) of a device, and used to authorize and/or control a device-to-device connection. The beacon sound signal may include an embedded code (e.g., pseudorandom noise (PN) code) that the device can decode, and have a frequency inaudible to a human (e.g., 18 kHz).

Figure 9:
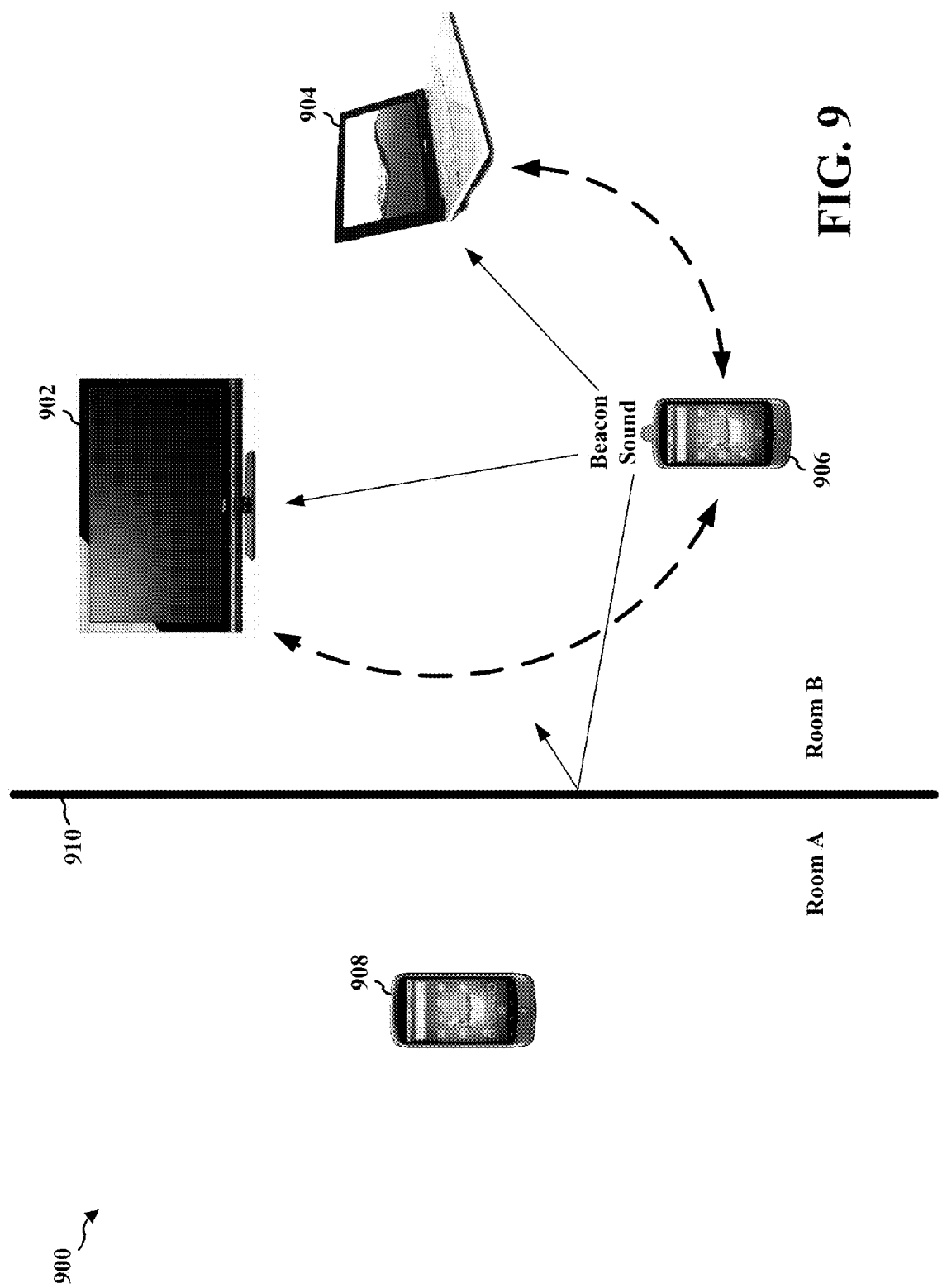
FIG. 9 is a diagram illustrating a communications system utilizing a beacon sound signal to automatically authorize a device-to-device connection.

FIG. 9 is a diagram 900 illustrating a communications system utilizing a beacon sound signal to automatically authorize a device-to-device connection. As shown in FIG. 9, a first device (e.g., television) 902, a second device (e.g., computer) 904, and a third device (e.g., mobile phone) 906 are located in the same general location (Room B). A fourth device (e.g., mobile phone) 908 is located in another location (Room A) separated from Room B by a wall 910. Each of the devices depicted in FIG. 9 may be referred to as a UE.

Referring to FIG. 9, the device 906 may emit a beacon sound signal via a sound transmitter (e.g., speaker) when the device 906 is interested in a device-to-device connection with either of the device 902 or the device 904. The beacon sound signal may include an embedded code (e.g., PN code) that may be decoded by the device 902 or the device 904. When either of the device 902 or device 904 detects the beacon sound signal, a Wi-Fi module of either of the devices may be activated to facilitate communication with the device 906. Moreover, the device 902 or device 904 may extract the embedded code from the detected beacon sound signal for decoding. Once decoded, the device 902 or the device 904 may compare the extracted code with a stored code. If the extracted code is recognized or matches the stored code in the device 902 or device 904, automatic pairing with the device 906 may be performed.

Further, as shown in FIG. 9, the wall 910 blocks the beacon sound signal emitted from the device 906 in Room A from entering into Room B. Thus, the device 908 is not able to detect the beacon sound signal, and therefore cannot automatically pair with the device 906 for device-to-device communication.

Sound transmission/reception thresholds for the beacon sound signal may be used to adjust a pairing distance (pairing range). For example, the device 906 may transmit the beacon sound signal at a volume of no more than 70 dB, while the device 902 may detect a beacon sound signal at a volume of no less than 60 dB. Because sound diminishes with distance, the pairing distance (pairing range) between the device 902 and the device 906 may be adjusted using the transmission threshold of the device 906 and the reception threshold of the device 902. Accordingly, a maximum pairing distance between the device 906 and the device 902 is a distance at which the beacon sound signal transmitted from the device 906 at a volume of 70 dB diminishes to a volume of 60 dB, the minimum volume at which the device 902 can detect the beacon sound signal.

The device-to-device communication authorization process described above may have a number of uses, including automatic video switching and easy file sharing, for example. In particular, for automatic video switching, when a user watches a video on a mobile terminal, and later walks into a room having a television with a large display, the user may seamlessly transfer the video on the mobile terminal to the television for larger viewing. Conversely, if the user is watching the video on the television, and later needs to step out of the room, the video may be seamlessly transferred to the user's mobile terminal allowing the user to watch the video away from the television. With respect to easy file sharing, after the user activates an application on a device, the user may seamlessly share files with other devices automatically paired with the device.

Figure 10:
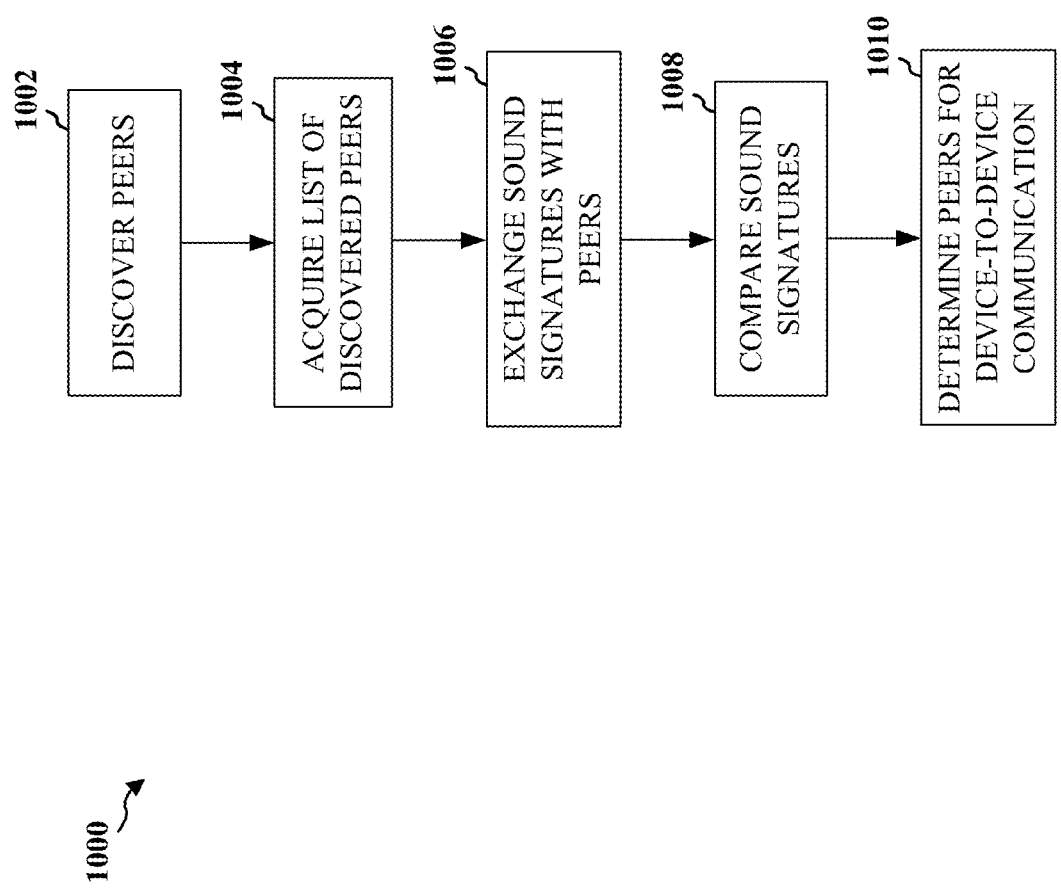
FIG. 10 is a flow chart of a method of wireless communication.

FIG. 10 is a flow chart 1000 of a method of wireless communication. The method may be performed by a UE for automatically controlling a device-to-device connection. At 1002, the UE may discover peer devices. Thereafter, at 1004, the UE may acquire a list of discovered peers interested in device-to-device communication.

At 1006, for each peer device interested in device-to-device communication with the UE, the UE exchanges a sound signature with each interested peer device. At 1008, the UE compares a sound signature received from a peer device with its own sound signature. At 1010, if the sound signatures are highly similar, then the UE determines that the peer device is in the same general location as the UE, and is therefore close enough to automatically pair with for device-to-device communication.

Figure 11:
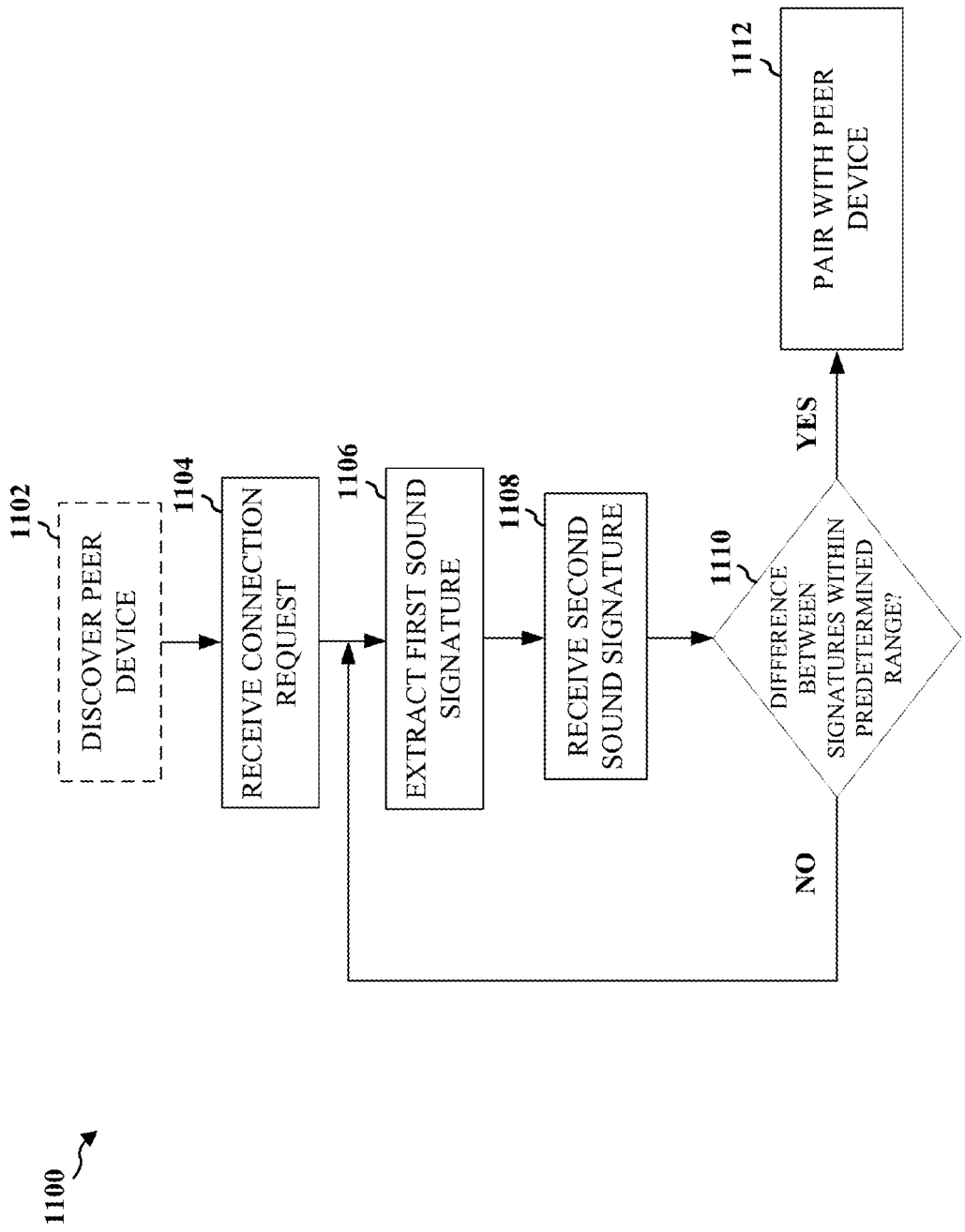
FIG. 11 is a flow chart of a method of wireless communication.

FIG. 11 is a flow chart 1100 of a method of wireless communication. The method may be performed by a UE for automatically controlling a device-to-device connection. At 1102, the UE may optionally discover one or more peer devices. If any of the discovered peer device(s) are interested in a device-to-device connection, then at 1104, the UE may receive a connection request from the peer device(s). Alternatively, if the UE does not discover the one or more peer devices, the flow may begin at 1104 with the UE receiving a connection request from a peer device.

At 1106, upon receiving the connection request, the UE may activate a sound sensor (e.g., microphone) for capturing a sound signal. The sound signal may comprise a sound of an environment in which the UE is located (i.e., environmental sound information). Moreover, the sound signal may be captured from a certain direction relative to the UE. For example, the UE may employ an array of microphones for selectively capturing sound signals from specific directions. Upon capturing the sound signal, the UE may extract a first sound signature from the sound signal.

At 1108, the UE may receive a second sound signature from the peer device. The second sound signature may be a sound signature extracted from environmental sound information captured at the peer device.

At 1110, the UE may compare the first sound signature to the second sound signature. In particular, the UE may determine whether a difference between the first sound signature and the second sound signature is within a predetermined range. The difference between the first sound signature and the second sound signature may be within the predetermined range when the peer device is within a predetermined proximity.

At 1112, when the difference between the first sound signature and the second sound signature is within the predetermined range, the peer device is considered to be close enough to pair with the UE. Accordingly, the UE pairs with the peer device. Pairing with the peer device may include sending a connection acceptance to the peer device.

When the difference between the first sound signature and the second sound signature is not within the predetermined range, the UE proceeds back to 1106. After a certain number of attempts without successfully pairing with the peer device, the UE may stop the attempt to pair. Alternatively, the UE may immediately stop the attempt to pair when the difference between the first sound signature and the second sound signature is determined not to be within the predetermined range at 1110.

Figure 12:
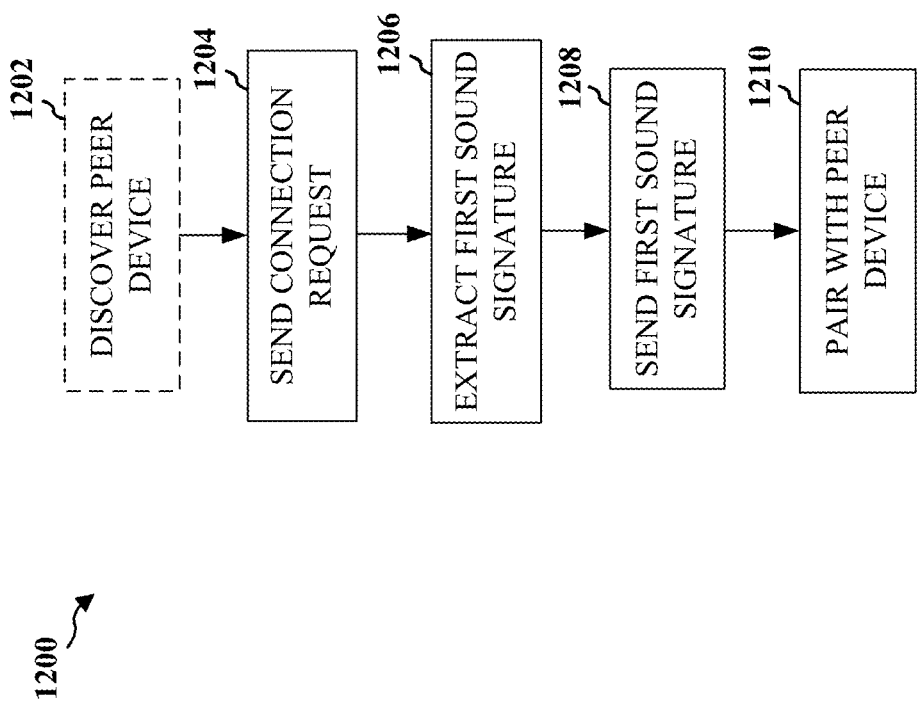
FIG. 12 is a flow chart of a method of wireless communication.

FIG. 12 is a flow chart 1200 of a method of wireless communication. The method may be performed by a UE for automatically controlling a device-to-device connection. At 1202, the UE may optionally discover one or more peer devices. If the UE is interested in a device-to-device connection with one or more of the discovered peer devices, then at 1204, the UE may send a connection request to the peer device(s). Alternatively, the UE may broadcast the connection request to any listening and/or nearby peer devices without first discovering the peer devices at 1202.

At 1206, upon sending the connection request, the UE may activate a sound sensor (e.g., microphone) for capturing a sound signal. The sound signal may comprise a sound of an environment in which the UE is located (i.e., environmental sound information). Moreover, the sound signal may be captured from a certain direction relative to the UE. For example, the UE may employ an array of microphones for selectively capturing sound signals from specific directions. Upon capturing the sound signal, the UE may extract a first sound signature from the sound signal.

At 1208, the UE may send the first sound signature to the peer device. And at 1210, the UE may pair with the peer device. Pairing with the peer device may include receiving a connection acceptance from the peer device, and confirming the connection with the peer device.

Figure 13:
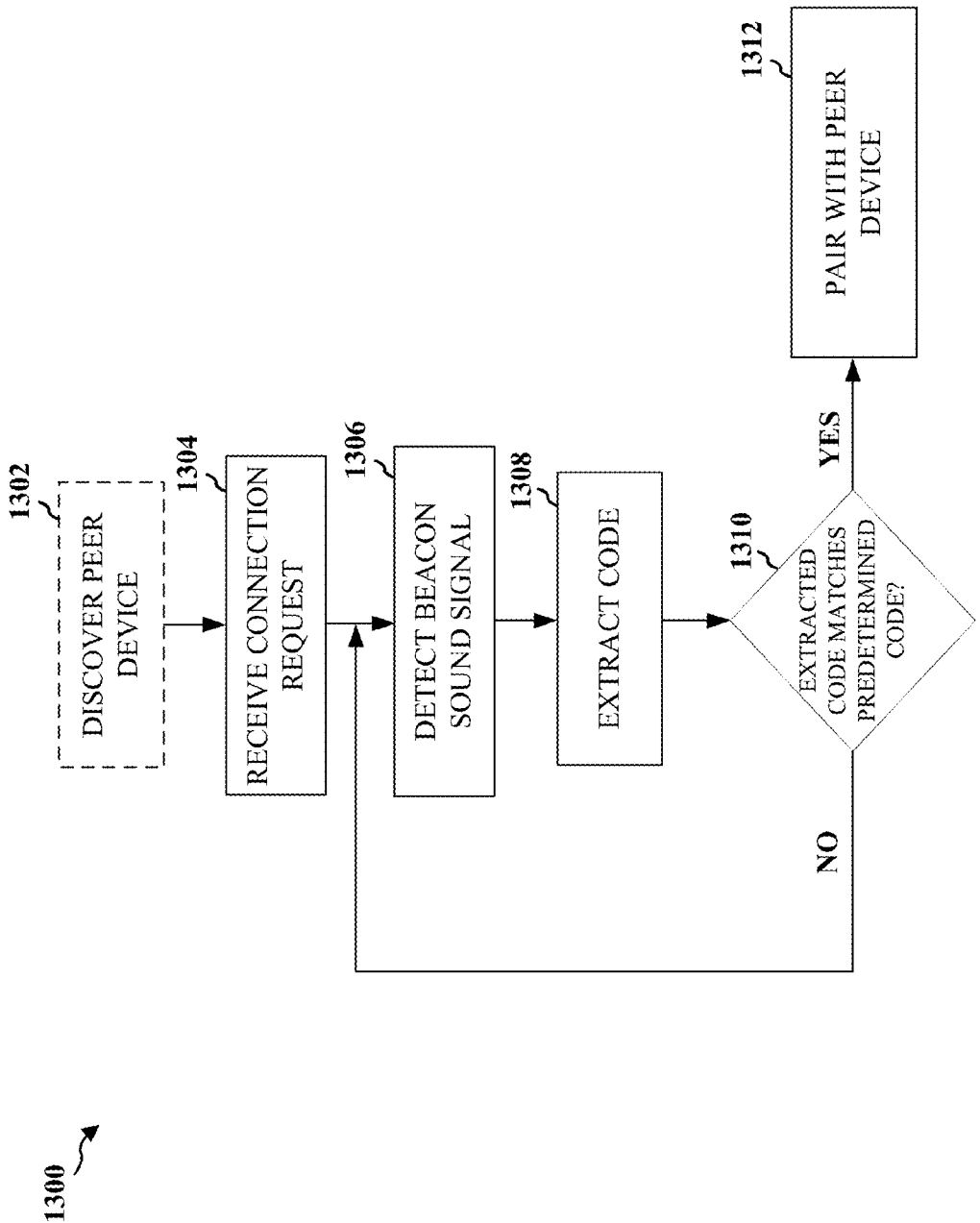
FIG. 13 is a flow chart of a method of wireless communication.

FIG. 13 is a flow chart 1300 of a method of wireless communication. The method may be performed by a UE for automatically controlling a device-to-device connection. At 1302, the UE may optionally discover one or more peer devices. If the discovered peer devices are interested in a device-to-device connection, then at 1304, the UE may receive a connection request from the peer device. Alternatively, if the UE does not discover the one or more peer devices, the flow may begin at 1304 with the UE receiving a connection request from a peer device.

At 1306, upon receiving the connection request, the UE may activate a sound sensor (e.g., microphone) for detecting a beacon sound signal emitted from the peer device. The beacon sound signal may be detected by the UE when the peer device is within a predetermined proximity. Moreover, the beacon sound signal may be detected from a certain direction relative to the UE. For example, the UE may employ an array of microphones for selectively detecting beacon sound signals from specific directions.

At 1308, upon detecting the beacon sound signal, the UE may extract a code (e.g., PN code) embedded in the beacon sound signal. At 1310, the UE may compare the extracted code to a predetermined code known to the UE. In particular, the UE may determine whether the extracted code matches the predetermined code known to the UE.

At 1312, when the extracted code matches the predetermined code known to the UE, the peer device is considered to be close enough to pair with the UE. Accordingly, the UE pairs with the peer device. Pairing with the peer device may include sending a connection acceptance to the peer device.

When the extracted code does not match the predetermined code known to the UE, the UE proceeds back to 1306. After a certain number of attempts without successfully pairing with the peer device, the UE may stop the attempt to pair. Alternatively, the UE may immediately stop the attempt to pair when the extracted code is determined not to match the predetermined code at 1310.

In an alternative aspect, the UE can listen for a beacon sound signal, and on detecting a beacon sound signal, it can extract the predetermined code and request a connection by sending the extracted code to the peer device. In this aspect, the user does not need to control the UE and the peer device in order to pair, because one device can react automatically based on the detected beacon sound signal. If an always-on microphone is enabled, this aspect can provide significant convenience for the user.

Figure 14:
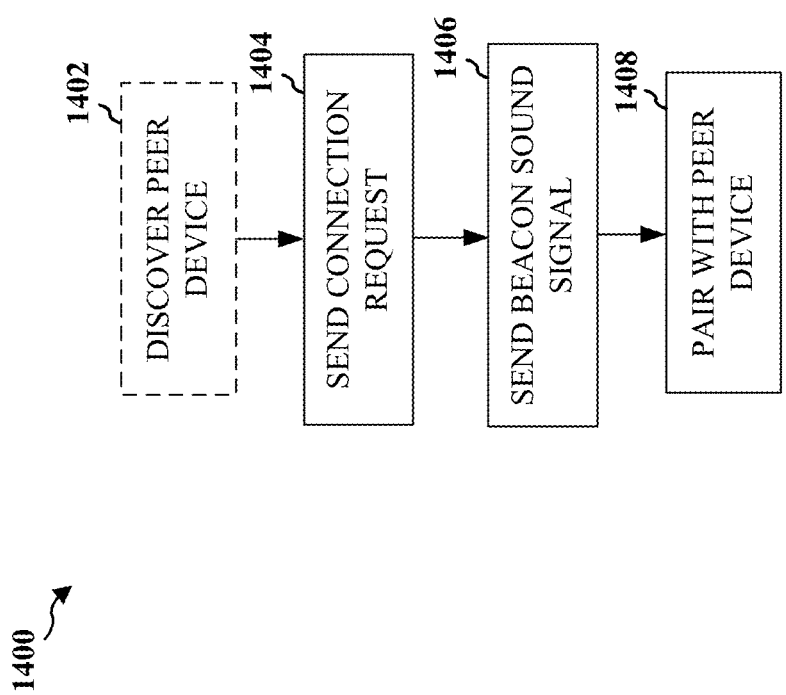
FIG. 14 is a flow chart of a method of wireless communication.

FIG. 14 is a flow chart 1400 of a method of wireless communication. The method may be performed by a UE for automatically controlling a device-to-device connection. At 1402, the UE may optionally discover one or more peer devices. If the UE is interested in a device-to-device connection, then at 1404, the UE may send a connection request to one or more of the peer devices. Alternatively, the UE may broadcast the connection request to any listening and/or nearby peer devices without first discovering the peer devices at 1402.

At 1406, upon sending the connection request, the UE may activate a sound transmitter (e.g., speaker) for sending a beacon sound signal to the peer device. A predetermined code (e.g., PN code), decodable by the peer device, may be embedded in the beacon sound signal. The beacon sound signal may be detected by the peer device if the peer device is within a predetermined proximity. Moreover, the beacon sound signal may be detected by the peer device from a certain direction.

At 1408, the UE may pair with the peer device. Pairing with the peer device may include receiving a connection acceptance from the peer device and confirming the connection with the peer device.

Alternatively, the UE can broadcast the beacon sound signal first, i.e. before 1402 and/or 1404, and then wait for a connection request. The received connection request can include the predetermined code extracted from the beacon sound signal by the peer device. In response to receiving the connection request, the UE can pair with the peer device if the received code matches the predetermined code that the UE previously broadcasted.

Figure 15:
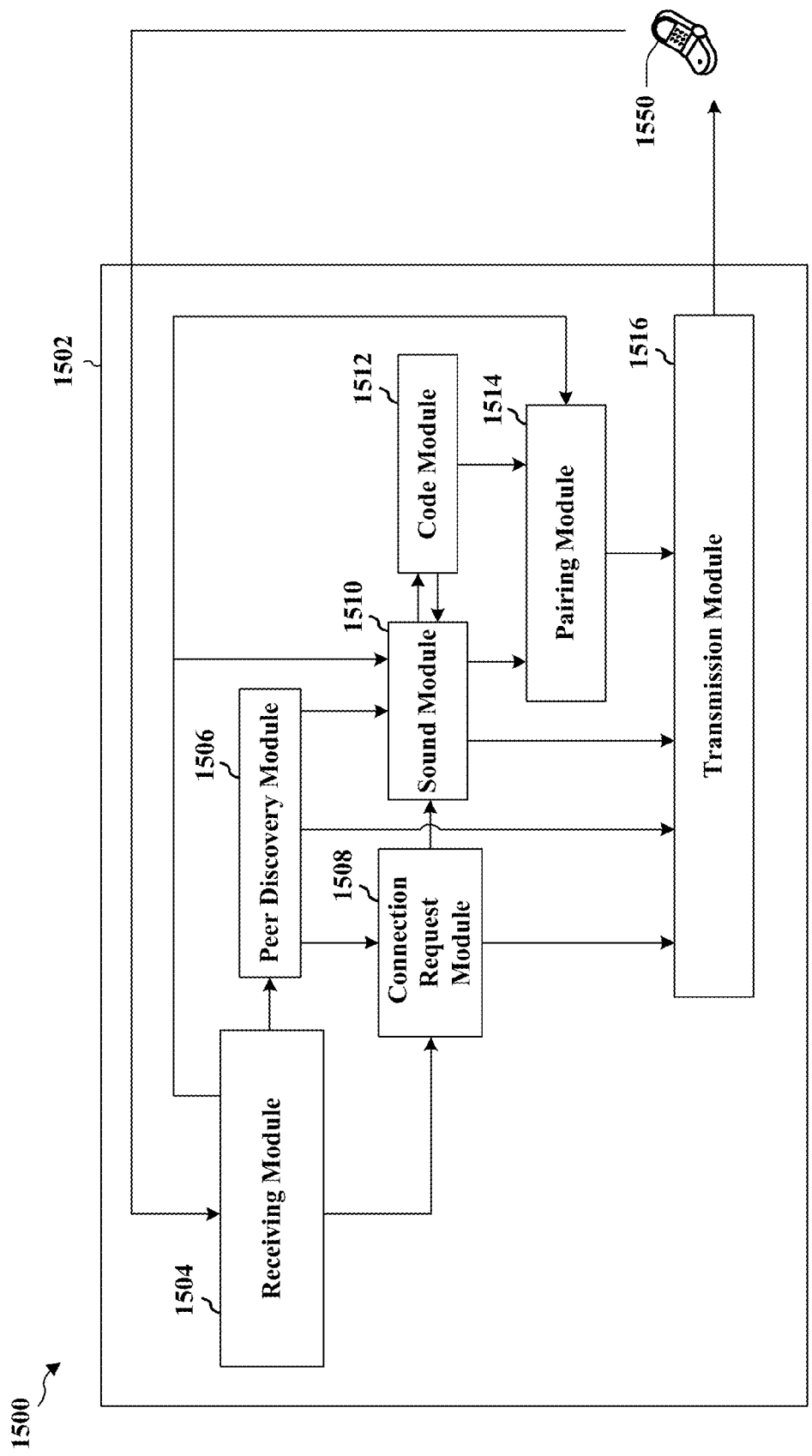
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus 1502 includes a receiving module 1504, a peer discovery module 1506, a connection request module 1508, a sound module 1510, a code module 1512, a pairing module 1514, and a transmission module 1516.

The peer discovery module 1506 may discover a peer device 1550. If the discovered peer device 1550 is interested in a device-to-device connection, the connection request module may receive a connection request from the peer device 1550 via the receiving module 1504.

Upon receiving the connection request at the connection request module 1508, the sound module 1510 may activate a sound sensor (e.g., microphone) for capturing a sound signal. The sound signal may comprise a sound of an environment in which the apparatus 1502 is located (i.e., environmental sound information). Moreover, the sound signal may be captured from a certain direction relative to the apparatus 1502. For example, the apparatus 1502 may employ an array of microphones for selectively capturing sound signals from specific directions. Upon capturing the sound signal, the sound module 1510 may extract a first sound signature from the sound signal.

The sound module 1510 may receive a second sound signature from the peer device 1550 via the receiving module 1504. The second sound signature may be a sound signature extracted from environmental sound information captured at the peer device 1550.

The sound module 1510 may compare the first sound signature to the second sound signature. In particular, the sound module 1510 may determine whether a difference between the first sound signature and the second sound signature is within a predetermined range. The difference between the first sound signature and the second sound signature may be within the predetermined range when the peer device 1550 is within a predetermined proximity.

When the difference between the first sound signature and the second sound signature is within the predetermined range, the peer device 1550 is considered to be close enough to pair with the UE. Accordingly, the pairing module 1514 facilitates pairing with the peer device 1550. Pairing with the peer device 1550 may include sending a connection acceptance to the peer device 1550 via the transmission module 1516.

When the difference between the first sound signature and the second sound signature is not within the predetermined range, the apparatus 1502 may continue to attempt to pair with the peer device 1550. After a certain number of attempts without successfully pairing with the peer device 1550, the apparatus 1502 may stop the attempt to pair. Alternatively, the apparatus 1502 may immediately stop the attempt to pair when the sound module 1510 determines that the difference between the first sound signature and the second sound signature is not within the predetermined range.

In an aspect, the peer discovery module 1506 may discover a peer device 1550. If the apparatus 1502 is interested in a device-to-device connection, the connection request module may send a connection request to the peer device 1550 via the transmission module 1516.

Upon sending the connection request at the connection request module 1508, the sound module 1510 may activate a sound sensor (e.g., microphone) for capturing a sound signal. Upon capturing the sound signal, the sound module 1510 may extract a first sound signature from the sound signal.

The sound module 1510 may send the first sound signature to the peer device 1550 via the transmission module 1516. Thereafter, the pairing module 1514 may facilitate pairing with the peer device 1550. Pairing with the peer device 1550 may include receiving a connection acceptance from the peer device 1550 via the receiving module 1504, and confirming the connection with the peer device 1550 via the transmission module 1516.

In a further aspect, the peer discovery module 1506 may discover a peer device 1550. If the discovered peer device 1550 is interested in a device-to-device connection, the connection request module 1508 may receive a connection request from the peer device 1550 via the receiving module 1504.

Upon receiving the connection request at the receiving module 1504, the sound module 1510 may activate a sound sensor (e.g., microphone) for detecting a beacon sound signal emitted from the peer device 1550. The beacon sound signal may be detected by the sound module 1510 when the peer device 1550 is within a predetermined proximity. Moreover, the beacon sound signal may be detected from a certain direction relative to the apparatus 1502. For example, the apparatus 1502 may employ an array of microphones for selectively detecting beacon sound signals from specific directions.

Upon detecting the beacon sound signal at the sound module 1510, the code module 1512 may extract a code (e.g., PN code) embedded in the beacon sound signal. The code module 1512 may compare the extracted code to a predetermined code known to the code module 1512. In particular, the code module 1512 may determine whether the extracted code matches the predetermined code known to the code module 1512.

When the extracted code matches the predetermined code known to the code module 1512, the peer device 1550 is considered to be close enough to pair with the UE. Accordingly, the pairing module 1514 pairs with the peer device 1550. Pairing with the peer device 1550 may include sending a connection acceptance to the peer device 1550 via the transmission module 1516.

When the extracted code does not match the predetermined code known to the code module 1512, the apparatus 1502 may continue to attempt to pair with the peer device 1550. After a certain number of attempts without successfully pairing with the peer device 1550, the apparatus 1502 may stop the attempt to pair. Alternatively, the apparatus 1502 may immediately stop the attempt to pair when the code module 1512 determines that the extracted code does not match the predetermined code.

In another aspect, the peer discovery module 1506 may discover a peer device 1550. If the apparatus 1502 is interested in the device-to-device connection, the connection request module 1508 may send a connection request to the peer device 1550 via the transmission module 1516.

Upon the connection request module 1508 sending the connection request, the sound module 1510 may activate a sound transmitter (e.g., speaker) for sending a beacon sound signal to the peer device 1550. A predetermined code (e.g., PN code), decodable by the peer device 1550, may be embedded in the beacon sound signal. The beacon sound signal may be detected by the peer device 1550 if the peer device 1550 is within a predetermined proximity. Moreover, the beacon sound signal may be detected by the peer device 1550 from a certain direction.

The pairing module 1514 may facilitate pairing with the peer device 1550. Pairing with the peer device 1550 may include receiving a connection acceptance from the peer device 1550 via the receiving module 1504, and confirming the connection with the peer device 1550 via the transmission module 1516.

The apparatus may include additional modules that perform each of the aspects of the algorithm in the aforementioned flow charts of FIGS. 10-14. As such, each aspect in the aforementioned flow charts of FIGS. 10-14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
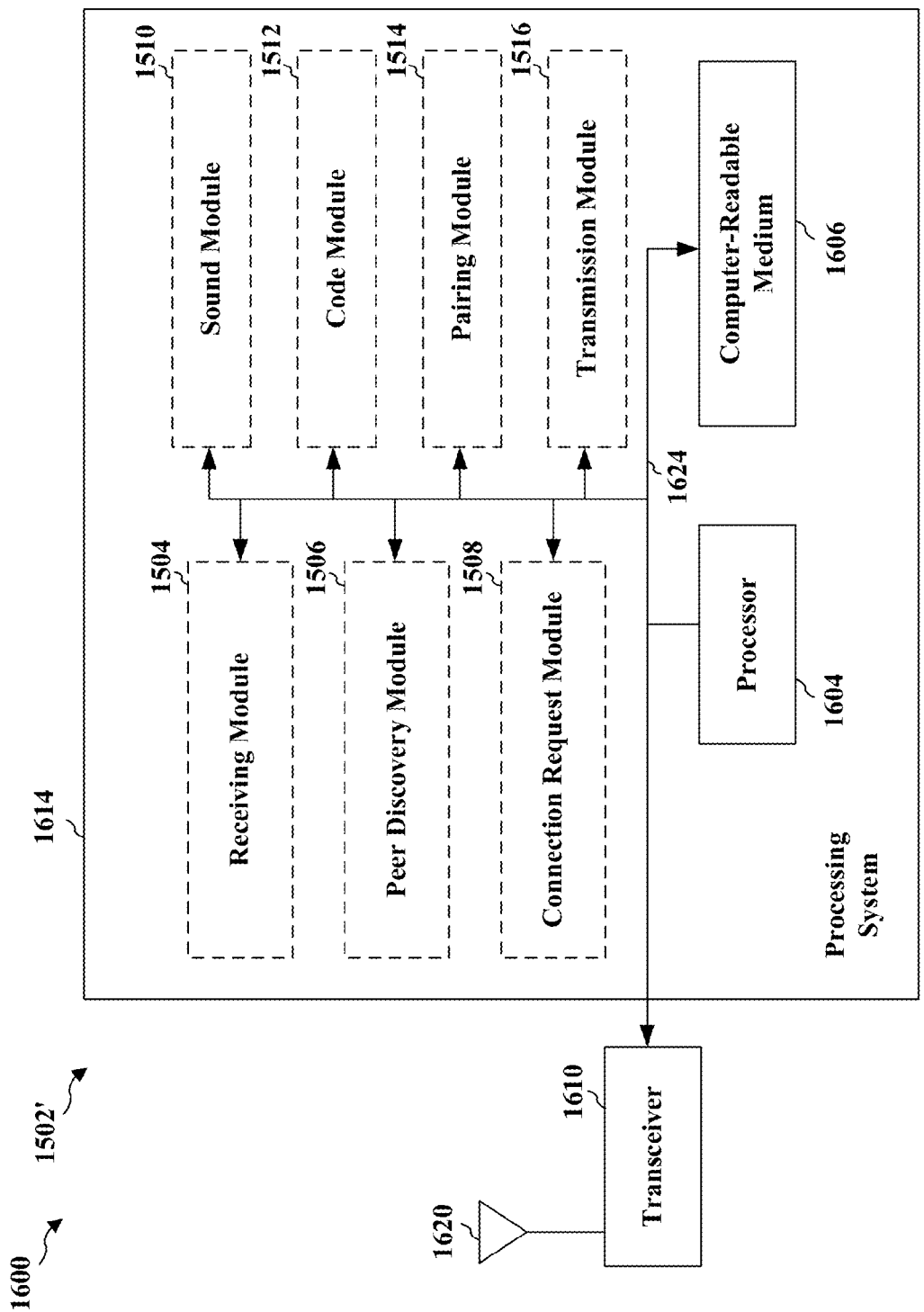
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, 1514, 1516, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus.

The computer-readable medium 1606 may also be used for storing data that is manipulated by the processor 1604 when executing software. The processing system further includes at least one of the modules 1504, 1506, 1508, 1510, 1512, 1514, and 1516. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for discovering a peer device, means for receiving a connection request from the peer device, means for extracting a first sound signature, means for receiving a second sound signature from the peer device, means for comparing the first sound signature to the second sound signature, means for pairing with the peer device when a difference between the first sound signature and the second sound signature is within a predetermined range, means for sending a connection request to the peer device, means for sending the first sound signature to the peer device, means for pairing with the peer device, means for detecting a beacon sound signal, means for extracting a code embedded in the beacon sound signal, means for pairing with the peer device when the code matches a predetermined code, and means for sending a beacon sound signal, wherein a predetermined code is embedded in the beacon sound signal.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX processor 668, the RX processor 656, and the controller/processor 659. As such, in one configuration, the aforementioned means may be the TX processor 668, the RX processor 656, and the controller/processor 659 configured to perform the functions recited by the aforementioned means.

Figure 17:
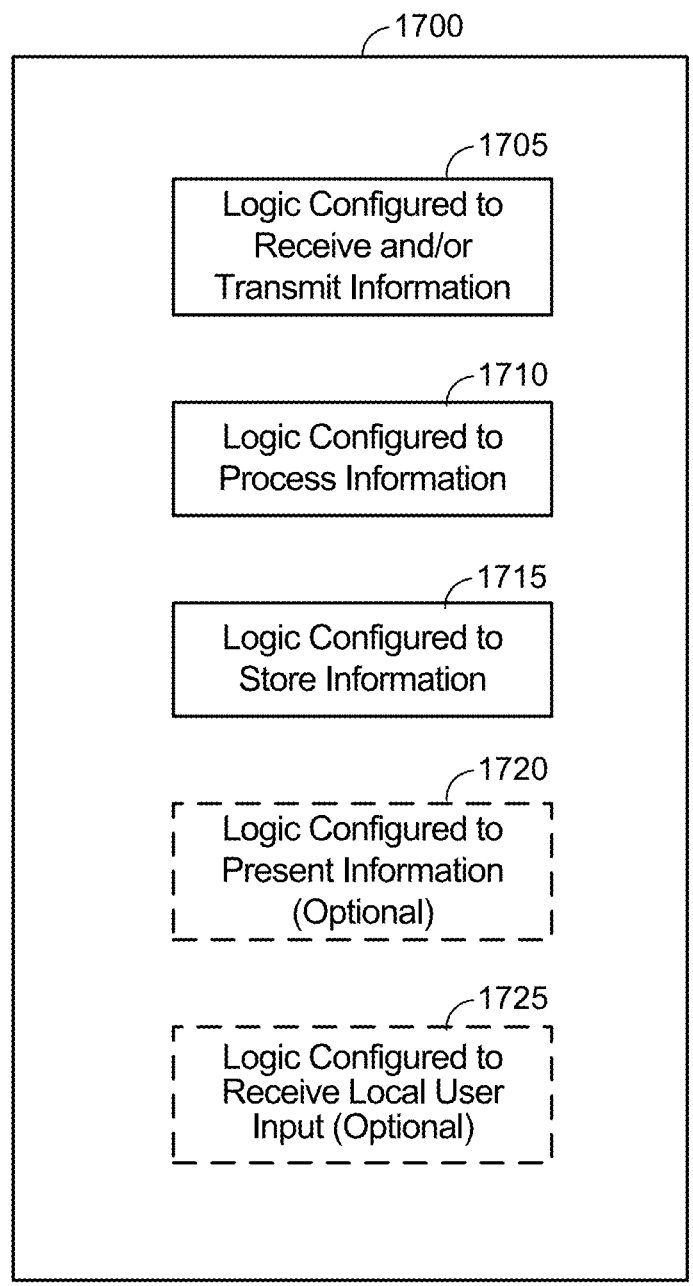
FIG. 17 illustrates a communication device that includes logic configured to perform functionality in accordance with an aspect of the disclosure.

FIG. 17 illustrates a communication device 1700 that includes logic configured to perform functionality. The communication device 1700 can correspond to any of the above-noted communication devices, including but not limited to UEs 102, 206, 650, 706, 708, 710, 712, 802, 804, 806, 808, 902, 904, 906, 908, 1502, and 1550, any component of the E-UTRAN 104, any component of the EPC 110, any components coupled with the EPC 110 and/or the Internet (e.g., an application server), and so on. Thus, communication device 1700 can correspond to any electronic device that is configured to communicate with (or facilitate communication with) one or more other entities over the EPS 100 of FIG. 1.

Referring to FIG. 17, the communication device 1700 includes logic configured to receive and/or transmit information 1705. In an example, if the communication device 1700 corresponds to a wireless communications device (e.g., UE 650), the logic configured to receive and/or transmit information 1705 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 1705 can correspond to a wired communications interface (e.g., a serial connection, a USB or Firewire connection, an Ethernet connection through which the Internet can be accessed, etc.). Thus, if the communication device 1700 corresponds to some type of network-based server, the logic configured to receive and/or transmit information 1705 can correspond to an Ethernet card, in an example, that connects the network-based server to other communication entities via an Ethernet protocol. In a further example, the logic configured to receive and/or transmit information 1705 can include sensory or measurement hardware by which the communication device 1700 can monitor its local environment (e.g., an accelerometer, a temperature sensor, a light sensor, an antenna for monitoring local RF signals, etc.). The logic configured to receive and/or transmit information 1705 can also include software that, when executed, permits the associated hardware of the logic configured to receive and/or transmit information 1705 to perform its reception and/or transmission function(s). However, the logic configured to receive and/or transmit information 1705 does not correspond to software alone, and the logic configured to receive and/or transmit information 1705 relies at least in part upon hardware to achieve its functionality.

Referring to FIG. 17, the communication device 1700 further includes logic configured to process information 1710. In an example, the logic configured to process information 1710 can include at least a processor. Example implementations of the type of processing that can be performed by the logic configured to process information 1710 includes but is not limited to performing determinations, establishing connections, making selections between different information options, performing evaluations related to data, interacting with sensors coupled to the communication device 1700 to perform measurement operations, converting information from one format to another (e.g., between different protocols such as .wmv to .avi, etc.), and so on. For example, the processor included in the logic configured to process information 1710 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1710 can also include software that, when executed, permits the associated hardware of the logic configured to process information 1710 to perform its processing function(s). However, the logic configured to process information 1710 does not correspond to software alone, and the logic configured to process information 1710 relies at least in part upon hardware to achieve its functionality.

Referring to FIG. 17, the communication device 1700 further includes logic configured to store information 1715. In an example, the logic configured to store information 1715 can include at least a non-transitory memory and associated hardware (e.g., a memory controller, etc.). For example, the non-transitory memory included in the logic configured to store information 1715 can correspond to RAM, flash memory, ROM, erasable programmable ROM (EPROM), EEPROM, registers, hard disk, a removable disk, a CD-ROM, or any other form of storage medium known in the art. The logic configured to store information 1715 can also include software that, when executed, permits the associated hardware of the logic configured to store information 1715 to perform its storage function(s). However, the logic configured to store information 1715 does not correspond to software alone, and the logic configured to store information 1715 relies at least in part upon hardware to achieve its functionality.

Referring to FIG. 17, the communication device 1700 further optionally includes logic configured to present information 1720. In an example, the logic configured to present information 1720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1700. For example, the logic configured to present information 1720 can include a display, a touchscreen, a sound transmitter, etc. In a further example, the logic configured to present information 1720 can be omitted for certain communication devices, such as network communication devices that do not have a local user (e.g., network switches or routers, remote servers, etc.). The logic configured to present information 1720 can also include software that, when executed, permits the associated hardware of the logic configured to present information 1720 to perform its presentation function(s). However, the logic configured to present information 1720 does not correspond to software alone, and the logic configured to present information 1720 relies at least in part upon hardware to achieve its functionality.

Referring to FIG. 17, the communication device 1700 further optionally includes logic configured to receive local user input 1725. In an example, the logic configured to receive local user input 1725 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1700. For example, the logic configured to receive local user input 1725 can include a keypad, a touchscreen display, a microphone, etc. In a further example, the logic configured to receive local user input 1725 can be omitted for certain communication devices, such as network communication devices that do not have a local user (e.g., network switches or routers, remote servers, etc.). The logic configured to receive local user input 1725 can also include software that, when executed, permits the associated hardware of the logic configured to receive local user input 1725 to perform its input reception function(s). However, the logic configured to receive local user input 1725 does not correspond to software alone, and the logic configured to receive local user input 1725 relies at least in part upon hardware to achieve its functionality.

Referring to FIG. 17, while the configured logics of 1705 through 1725 are shown as separate or distinct blocks in FIG. 17, it will be appreciated that the hardware and/or software by which the respective configured logic performs its functionality can overlap in part. For example, any software used to facilitate the functionality of the configured logics of 1705 through 1725 can be stored in the non-transitory memory associated with the logic configured to store information 1715, such that the configured logics of 1705 through 1725 each performs their functionality (i.e., in this case, software execution) based in part upon the operation of software stored by the logic configured to store information 1715. Likewise, hardware that is directly associated with one of the configured logics can be borrowed or used by other configured logics from time to time. For example, the processor of the logic configured to process information 1710 can format data into an appropriate format before being transmitted by the logic configured to receive and/or transmit information 1705, such that the logic configured to receive and/or transmit information 1705 performs its functionality (i.e., in this case, transmission of data) based in part upon the operation of hardware (i.e., the processor) associated with the logic configured to process information 1710.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

It is understood that the specific order or hierarchy of aspects in the processes disclosed is an illustration of exemplary approaches. Based upon design preferences, it is understood that the specific order or hierarchy of aspects in the processes may be rearranged. Further, some aspects may be combined or omitted. The accompanying method claims present elements of the various aspects in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for automatically controlling a device-to-device connection, comprising:
   extracting a first sound signature from a sound signal, wherein the sound signal represents a sound of an environment of a device extracting the first sound signature;
   receiving a second sound signature from a peer device, wherein the second sound signature comprises a sound signature extracted from a sound of an environment of the peer device;

comparing the first sound signature to the second sound signature; and pairing with the peer device when a difference between the first sound signature and the second sound signature is within a predetermined range, wherein the difference between the first sound signature and the second sound signature is within the predetermined range when the peer device is within a predetermined proximity of the device extracting the first sound signature.

2. The method of claim 1, further comprising:
discovering the peer device; and
receiving a connection request from the peer device.

3. The method of claim 1, wherein the sound signature is extracted from the sound signal emanating from a certain direction using an array of microphones.

4. The method of claim 1, further comprising:
sending the first sound signature to the peer device, wherein the peer device compares the first sound signature to the second sound signature to determine whether or not the difference between the first sound signature and the second sound signature is within the predetermined range.

5. The method of claim 1, wherein the pairing with the peer device comprises sending a connection acceptance to the peer device.

6. The method of claim 1, wherein a peer device performing the extracting, receiving, comparing, and pairing communicates with the peer device using the device-to-device connection.

7. The method of claim 6, wherein the device-to-device connection comprises a wireless device-to-device communication system based on one of WiMedia, Bluetooth, ZigBee, Wi-Fi, Wi-Fi Direct, or LTE Direct.

8. A method for automatically controlling a device-to-device connection, comprising:
extracting a first sound signature from a sound signal, wherein the sound signal represents a sound of an environment of a device extracting the first sound signature;
sending the first sound signature to a peer device; and
pairing with the peer device when a difference between the first sound signature and a second sound signature is within a predetermined range, wherein the difference between the first sound signature and the second sound signature is within the predetermined range when the peer device is within a predetermined proximity.

9. The method of claim 8, further comprising:
discovering the peer device; and
sending a connection request to the peer device.

10. The method of claim 8, wherein the sound signature is extracted from the sound signal emanating from a certain direction using an array of microphones.

11. The method of claim 8, wherein the pairing with the peer device comprises:
receiving a connection acceptance from the peer device; and
confirming the device-to-device connection with the peer device.

12. The method of claim 8, wherein a peer device performing the extracting, sending, and pairing communicates with the peer device using the device-to-device connection.

13. The method of claim 12, wherein the device-to-device connection comprises a wireless device-to-device communication system based on one of WiMedia, Bluetooth, ZigBee, Wi-Fi, Wi-Fi Direct, or LTE Direct.

14. A method for automatically controlling a device-to-device connection, comprising:
receiving a connection request from a peer device;
detecting a beacon sound signal emitted by the peer device after receiving the connection request from the peer device, wherein the beacon sound signal is detected from a certain direction;
extracting a code embedded in the beacon sound signal; and
pairing with a peer device when the code matches a predetermined code stored at a device extracting the code embedded in the beacon sound signal, wherein the code matches the predetermined code when the peer device is within a predetermined proximity of the device extracting the code.

15. The method of claim 14, further comprising:
discovering the peer device; and
receiving a connection request from the peer device.

16. The method of claim 14, wherein the beacon sound signal is detected via a sound sensor.

17. The method of claim 14, wherein the beacon sound signal is detected from the certain direction using an array of microphones.

18. The method of claim 14, wherein the pairing with the peer device comprises sending a connection acceptance to the peer device.

19. The method of claim 14, wherein the peer device is within the predetermined proximity based on a volume of the beacon sound signal being above a minimum threshold and below a maximum threshold.

20. The method of claim 14, wherein a peer device performing the detecting, extracting, and pairing communicates with the peer device using the device-to-device connection.

21. The method of claim 20, wherein the device-to-device connection comprises a wireless device-to-device communication system based on one of WiMedia, Bluetooth, ZigBee, Wi-Fi, Wi-Fi Direct, or LTE Direct.

22. A method for automatically controlling a device-to-device connection, comprising:
sending a connection request to a peer device;
sending a beacon sound signal to the peer device after sending the connection request to the peer device, wherein a predetermined code is embedded in the beacon sound signal, and wherein the beacon sound signal is detected by a peer device from a certain direction; and
pairing with the peer device based on the predetermined code matching a predetermined code stored at the peer device, wherein the code matches the predetermined code when the peer device is within a predetermined proximity of the device extracting the code.

23. The method of claim 22, further comprising:
discovering the peer device; and
sending a connection request to the peer device.

24. The method of claim 22, wherein the beacon sound signal is sent via a sound transmitter.

25. The method of claim 22, wherein the beacon sound signal is sent at a frequency inaudible to a human.

26. The method of claim 22, wherein the beacon sound signal is detected from the certain direction using an array of microphones.

27. The method of claim 22, wherein the pairing with the peer device comprises:
receiving a connection acceptance from the peer device; and
confirming the device-to-device connection with the peer device.

28. The method of claim 22, wherein the beacon sound signal is detected by the peer device within the predetermined proximity.

29. The method of claim 22, wherein a peer device performing the sending and pairing communicates with the peer device using the device-to-device connection.

30. The method of claim 29, wherein the device-to-device connection comprises a wireless device-to-device communication system based on one of WiMedia, Bluetooth, ZigBee, Wi-Fi, Wi-Fi Direct, or LTE Direct.

31. An apparatus for automatically controlling a device-to-device connection, comprising:
a processing system including a processor configured to:
extract a first sound signature from a sound signal, wherein the sound signal represents a sound of an environment of a device that extracts the first sound signature;
receive a second sound signature from a peer device, wherein the second sound signature comprises a sound signature extracted from a sound of an environment of the peer device;
compare the first sound signature to the second sound signature; and
pair with the peer device when a difference between the first sound signature and the second sound signature is within a predetermined range, wherein the difference between the first sound signature and the second sound signature is within the predetermined range when the peer device is within a predetermined proximity of the device that extracts the first sound signature.

32. The apparatus of claim 31, wherein the processing system is further configured to:
discover the peer device; and
receive a connection request from the peer device.

33. The apparatus of claim 31, wherein the processing system is configured to extract the sound signature from the sound signal emanating from the certain direction using an array of microphones.

34. The apparatus of claim 31, wherein the processing system is further configured to:
send the first sound signature to the peer device, wherein the peer device compares the first sound signature to the second sound signature to determine whether or not the difference between the first sound signature and the second sound signature is within the predetermined range.

35. The apparatus of claim 31, wherein the processing system being configured to pair with the peer device comprises the processing system being configured to send a connection acceptance to the peer device.

36. The apparatus of claim 31, wherein the apparatus communicates with the peer device using the device-to-device connection.

37. The apparatus of claim 36, wherein the device-to-device connection comprises a wireless device-to-device communication system based on one of WiMedia, Bluetooth, ZigBee, Wi-Fi, Wi-Fi Direct, or LTE Direct.

38. An apparatus for automatically controlling a device-to-device connection, comprising:
a processing system including a processor configured to:
extract a first sound signature, wherein from a sound signal, wherein the sound signal represents a sound of an environment of a device that extracts the first sound signature;
send the first sound signature to a peer device; and
pair with the peer device when a difference between the first sound signature and a second sound signature is within a predetermined range, wherein the difference between the first sound signature and the second sound signature is within the predetermined range when the peer device is within a predetermined proximity.

39. The apparatus of claim 38, wherein the processing system is further configured to:
discover the peer device; and
send a connection request to the peer device.

40. The apparatus of claim 38, wherein the processing system is configured to extract the sound signature from the sound signal emanating from a certain direction using an array of microphones.

41. The apparatus of claim 38, wherein the processing system being configured to pair with the peer device comprises the processing system being configured to:
receive a connection acceptance from the peer device; and
confirm the device-to-device connection with the peer device.

42. The apparatus of claim 38, wherein the apparatus communicates with the peer device using the device-to-device connection.

43. The apparatus of claim 42, wherein the device-to-device connection comprises a wireless device-to-device communication system based on one of WiMedia, Bluetooth, ZigBee, Wi-Fi, Wi-Fi Direct, or LTE Direct.

44. An apparatus for automatically controlling a device-to-device connection, comprising:
a processing system including a processor configured to:
receive a connection request from a peer device;
detect a beacon sound signal emitted by the peer device after reception of the connection request from the peer device, wherein the beacon sound signal is detected from a certain direction;
extract a code embedded in the beacon sound signal; and
pair with a peer device when the code matches a predetermined code stored at a device that extracts the code embedded in the beacon sound signal, wherein the code matches the predetermined code when the peer device is within a predetermined proximity of the device that extracts the code.

45. The apparatus of claim 44, wherein the processing system is further configured to:
discover the peer device; and
receive a connection request from the peer device.

46. The apparatus of claim 44, wherein the beacon sound signal is detected via a sound sensor.

47. The apparatus of claim 44, wherein the processing system is configured to detect the beacon sound signal from the certain direction using an array of microphones.

48. The apparatus of claim 44, wherein the processing system being configured to pair with the peer device comprises the processing system being configured to send a connection acceptance to the peer device.

49. The apparatus of claim 44, wherein the peer device is within the predetermined proximity based on a volume of the beacon sound signal being above a minimum threshold and below a maximum threshold.

50. The apparatus of claim 44, wherein the apparatus communicates with the peer device using the device-to-device connection.

51. The apparatus of claim 50, wherein the device-to-device connection comprises a wireless device-to-device communication system based on one of WiMedia, Bluetooth, ZigBee, Wi-Fi, Wi-Fi Direct, or LTE Direct.

52. An apparatus for automatically controlling a device-to-device connection, comprising:
a processing system including a processor configured to:
send a connection request to a peer device;
send a beacon sound signal to the peer device after the connection request is sent to the peer device, wherein a predetermined code is embedded in the beacon sound signal, and wherein the beacon sound signal is detected by a peer device from a certain direction; and
pair with the peer device based on the predetermined code matching a predetermined code stored at the peer device, wherein the code matches the predetermined code when the peer device is within a predetermined proximity of the device that extracts the code.

53. The apparatus of claim 52, wherein the processing system is further configured to:
discover the peer device; and
send a connection request to the peer device.

54. The apparatus of claim 52, wherein the beacon sound signal is sent via a sound transmitter.

55. The apparatus of claim 52, wherein the beacon sound signal is sent at a frequency inaudible to a human.

56. The apparatus of claim 52, wherein the processing system is configured to detect the beacon sound signal from the certain direction using an array of microphones.

57. The apparatus of claim 52, wherein the processing system being configured to pair with the peer device comprises the processing system being configured to:
receive a connection acceptance from the peer device; and
confirm the device-to-device connection with the peer device.

58. The apparatus of claim 52, wherein the beacon sound signal is detected by the peer device within the predetermined proximity.

59. The apparatus of claim 52, wherein the apparatus communicates with the peer device using the device-to-device connection.

60. The apparatus of claim 59, wherein the device-to-device connection comprises a wireless device-to-device communication system based on one of WiMedia, Bluetooth, ZigBee, Wi-Fi, Wi-Fi Direct, or LTE Direct.

61. An apparatus for automatically controlling a device-to-device connection, comprising:
means for extracting a first sound signature from a sound signal, wherein the sound signal represents a sound of an environment of a device that extracts the first sound signature;
means for receiving a second sound signature from a peer device, wherein the second sound signature comprises a sound signature extracted from a sound of an environment of the peer device;
means for comparing the first sound signature to the second sound signature; and
means for pairing with the peer device when a difference between the first sound signature and the second sound signature is within a predetermined range, wherein the difference between the first sound signature and the second sound signature is within the predetermined range when the peer device is within a predetermined proximity of the device that extracts the first sound signature.

62. An apparatus for automatically controlling a device-to-device connection, comprising:
means for extracting a first sound signature from a sound signal, wherein the sound signal represents a sound of an environment of a device that extracts the first sound signature;
means for sending the first sound signature to a peer device; and
means for pairing with the peer device when a difference between the first sound signature and a second sound signature is within a predetermined range, wherein the difference between the first sound signature and the second sound signature is within the predetermined range when the peer device is within a predetermined proximity.

63. An apparatus for automatically controlling a device-to-device connection, comprising:
means for receiving a connection request from a peer device;
means for detecting a beacon sound signal emitted by the peer device after reception of the connection request from the peer device, wherein the beacon sound signal is detected from a certain direction;
means for extracting a code embedded in the beacon sound signal; and
means for pairing with a peer device when the code matches a predetermined code stored at a device that extracts the code embedded in the beacon sound signal, wherein the code matches the predetermined code when the peer device is within a predetermined proximity of the device that extracts the code.

64. An apparatus for automatically controlling a device-to-device connection, comprising:
means for sending a connection request to a peer device;
means for sending a beacon sound signal to the peer device after the connection request is sent to the peer device, wherein a predetermined code is embedded in the beacon sound signal, and wherein the beacon sound signal is detected by a peer device from a certain direction; and
means for pairing with the peer device based on the predetermined code matching a predetermined code stored at the peer device, wherein the code matches the predetermined code when the peer device is within a predetermined proximity of the device that extracts the code.

65. A non-transitory computer-readable medium for automatically controlling a device-to-device connection, comprising:
at least one instruction to extract a first sound signature from a sound signal, wherein the sound signal represents a sound of an environment of a device that extracts the first sound signature;
at least one instruction to receive a second sound signature from a peer device, wherein the second sound signature comprises a sound signature extracted from a sound of an environment of the peer device;
at least one instruction to compare the first sound signature to the second sound signature; and
at least one instruction to pair with the peer device when a difference between the first sound signature and the second sound signature is within a predetermined range, wherein the difference between the first sound signature and the second sound signature is within the predetermined range when the peer device is within a predetermined proximity of the device that extracts the first sound signature.

66. A non-transitory computer-readable medium for automatically controlling a device-to-device connection, comprising:

at least one instruction to extract a first sound signature from a sound signal, wherein the sound signal represents a sound of an environment of a device that extracts the first sound signature;

at least one instruction to send the first sound signature to a peer device; and at least one instruction to pair with the peer device when a difference between the first sound signature and a second sound signature is within a predetermined range, wherein the difference between the first sound signature and the second sound signature is within the predetermined range when the peer device is within a predetermined proximity.

67. A non-transitory computer-readable medium for automatically controlling a device-to-device connection, comprising:

at least one instruction to receive a connection request from a peer device;

at least one instruction to detect a beacon sound signal emitted by the peer device after reception of the connection request from the peer device, wherein the beacon sound signal is detected from a certain direction;

at least one instruction to extract a code embedded in the beacon sound signal; and at least one instruction to pair with a peer device when the code matches a predetermined code stored at a device that extracts the code embedded in the beacon sound signal, wherein the code matches the predetermined code when the peer device is within a predetermined proximity of the device that extracts the code.

68. A non-transitory computer-readable medium for automatically controlling a device-to-device connection, comprising:

at least one instruction to send a connection request to a peer device;

at least one instruction to send a beacon sound signal to the peer device after the connection request is sent to the peer device, wherein a predetermined code is embedded in the beacon sound signal, and wherein the beacon sound signal is detected by a peer device from a certain direction; and at least one instruction to pair with the peer device based on the predetermined code matching a predetermined code stored at the peer device, wherein the code matches the predetermined code when the peer device is within a predetermined proximity of the device that extracts the code.

* * * * *